(12) United States Patent
May et al.

(10) Patent No.: US 8,100,294 B2
(45) Date of Patent: Jan. 24, 2012

(54) CONTAINER ASSEMBLY

(75) Inventors: Richard J. May, Saylorsburg, PA (US); David G. Robinson, Newton, NJ (US); Francesca Fazzolari, Hackettstown, NJ (US); Alexander T. Davidson, Sparta, NJ (US); Ronald M. Douros, Wantage, NJ (US)

(73) Assignee: James Alexander Corporation, Blairstown, NJ (US)

( * ) Notice: Subject to any disclaimer, the term of this patent is extended or adjusted under 35 U.S.C. 154(b) by 1070 days.

(21) Appl. No.: 11/959,095

(22) Filed: Dec. 18, 2007

(65) Prior Publication Data

US 2009/0152295 A1    Jun. 18, 2009

(51) Int. Cl.
| | | |
|---|---|---|
| *B67D 7/74* | (2010.01) | |
| *B67D 7/78* | (2010.01) | |
| *B43K 5/14* | (2006.01) | |
| *B65D 21/02* | (2006.01) | |
| *B65D 25/08* | (2006.01) | |

(52) U.S. Cl. ............ 222/129; 222/145.5; 222/189.06; 222/82; 222/214; 220/23.88; 220/23.89; 206/219; 206/222; 401/132; 401/41

(58) Field of Classification Search ............ 222/145.1, 222/145.5, 145.6, 129, 92, 94, 95, 105, 107, 222/212, 214, 215, 189.06, 189.11, 82, 192; 220/288, 23.83, 23.86, 23.87, 23.89, 23.88; 206/218, 219, 221, 222; 401/132, 40, 41, 401/196, 133
See application file for complete search history.

(56) References Cited

U.S. PATENT DOCUMENTS

| | | | |
|---|---|---|---|
| 1,105,457 | A | 7/1914 | Roberts |
| 1,229,195 | A | 6/1917 | Hamilton |
| 1,332,985 | A | 3/1920 | Jarrett |
| 1,587,598 | A | 6/1926 | Magg |
| 1,822,566 | A | 9/1931 | Davies |
| 2,058,251 | A | 10/1936 | Nitardy et al. |
| 2,311,367 | A | 2/1940 | Chambers |
| 2,219,604 | A | 10/1940 | Trotter |
| 2,371,667 | A | 3/1945 | Arena et al. |
| 2,517,604 | A | 8/1950 | Smith |
| 2,546,848 | A | 3/1951 | Bishop |
| 2,681,168 | A | 6/1954 | McMillon |

(Continued)

FOREIGN PATENT DOCUMENTS

BE    501779    3/1951

(Continued)

OTHER PUBLICATIONS

Partial International Search Report issued in corresponding PCT Application No. PCT/US2008/087123 on Apr. 27, 2009.

(Continued)

*Primary Examiner* — Kevin P Shaver
*Assistant Examiner* — Stephanie E Williams
(74) *Attorney, Agent, or Firm* — Banner & Witcoff, Ltd.

(57) ABSTRACT

A container assembly has a first container that operably houses a second container. The first container is configured to hold a first flowable substance, and the second container is configured to hold a second flowable substance. The second container is rupturable, preferably by manipulation through the first container, wherein the second flowable substance can mix with the first flowable substance to form a mixture. The first container is also rupturable to dispense the mixture therefrom.

28 Claims, 13 Drawing Sheets

U.S. PATENT DOCUMENTS

| | | | |
|---|---|---|---|
| 2,714,974 A | 8/1955 | Sawyer | |
| 2,754,590 A | 7/1956 | Cohen | |
| 2,832,087 A | 4/1958 | McEwan | |
| 3,029,987 A | 4/1962 | Gronemeyer | |
| 3,068,154 A * | 12/1962 | Majors | 435/309.1 |
| 3,124,828 A | 3/1964 | Barber et al. | |
| 3,152,352 A | 10/1964 | Kosik, Jr. | |
| 3,216,562 A | 11/1965 | Lockwood | |
| 3,248,017 A | 4/1966 | Allen | |
| 3,255,872 A | 6/1966 | Long et al. | |
| 3,369,543 A | 2/1968 | Ronco | |
| 3,399,020 A | 8/1968 | Margolis et al. | |
| 3,457,014 A | 7/1969 | Ward | |
| 3,481,513 A | 12/1969 | Ram | |
| 3,482,920 A | 12/1969 | Schwartzman | |
| 3,521,637 A | 7/1970 | Waterbury | |
| 3,584,211 A | 6/1971 | Rauhut | |
| 3,614,245 A | 10/1971 | Schwartzman | |
| 3,636,922 A | 1/1972 | Ketner | |
| 3,638,786 A * | 2/1972 | Borecki et al. | 206/219 |
| 3,658,719 A | 4/1972 | McConnaughey | |
| 3,684,136 A | 8/1972 | Baumann | |
| 3,702,677 A | 11/1972 | Heffington | |
| 3,741,383 A | 6/1973 | Wittwer | |
| 3,757,782 A | 9/1973 | Aiken | |
| 3,759,259 A | 9/1973 | Truhan | |
| 3,819,925 A * | 6/1974 | Richter et al. | 206/219 |
| 3,831,742 A | 8/1974 | Gardella et al. | |
| 3,856,138 A | 12/1974 | Maekawa et al. | |
| 3,876,314 A | 4/1975 | Nehring | |
| 3,891,331 A | 6/1975 | Avery | |
| 3,896,552 A | 7/1975 | Russell | |
| 3,896,808 A | 7/1975 | Szpur | |
| 3,924,623 A | 12/1975 | Avery | |
| 3,964,643 A | 6/1976 | Morane et al. | |
| 4,023,580 A | 5/1977 | Pieters | |
| 4,058,425 A | 11/1977 | Thrun | |
| 4,095,596 A | 6/1978 | Grayson | |
| 4,106,652 A | 8/1978 | Leclabart | |
| 4,121,746 A | 10/1978 | Frohlich et al. | |
| 4,150,950 A | 4/1979 | Takeguchi | |
| 4,183,684 A | 1/1980 | Avery | |
| 4,342,395 A | 8/1982 | Brown | |
| 4,364,474 A * | 12/1982 | Hollander, Jr. | 206/219 |
| 4,378,069 A | 3/1983 | Franco | |
| 4,432,530 A | 2/1984 | Marcinek | |
| 4,432,749 A | 2/1984 | Snyder et al. | |
| 4,441,227 A | 4/1984 | d'Argembeau | |
| 4,452,262 A | 6/1984 | Jankewitz | |
| 4,572,689 A | 2/1986 | Chernack | |
| 4,620,648 A | 11/1986 | Schwartzman | |
| 4,622,985 A | 11/1986 | Jankewitz | |
| 4,625,140 A | 11/1986 | Gagnon | |
| 4,633,886 A | 1/1987 | Bucaro | |
| 4,657,134 A | 4/1987 | Woodworth et al. | |
| 4,674,903 A | 6/1987 | Chen | |
| 4,696,393 A | 9/1987 | Laipply | |
| 4,765,518 A | 8/1988 | O'Meara | |
| 4,780,083 A | 10/1988 | Croll | |
| 4,844,641 A | 7/1989 | Grosfilley et al. | |
| 4,867,326 A | 9/1989 | O'Meara | |
| 4,872,556 A | 10/1989 | Farmer | |
| 4,875,602 A | 10/1989 | Chickering et al. | |
| 4,884,703 A | 12/1989 | O'Meara | |
| 4,927,012 A | 5/1990 | Rowe | |
| 4,940,350 A | 7/1990 | Kim | |
| 4,942,330 A | 7/1990 | Karlotski et al. | |
| 4,946,389 A | 8/1990 | Weissenburger | |
| 4,952,204 A | 8/1990 | Korteweg | |
| 4,953,560 A | 9/1990 | Samuels | |
| 4,973,181 A | 11/1990 | Jankewitz | |
| 4,984,381 A | 1/1991 | Seifert | |
| 4,990,016 A | 2/1991 | Seidler | |
| 5,002,198 A | 3/1991 | Smith | |
| 5,035,348 A | 7/1991 | Seifert | |
| 5,038,455 A | 8/1991 | Guest | |
| 5,042,690 A | 8/1991 | O'Meara | |
| 5,052,589 A | 10/1991 | O'Meara | |
| 5,054,948 A | 10/1991 | Honda et al. | |
| 5,065,913 A | 11/1991 | Glasener | |
| 5,098,297 A | 3/1992 | Chari et al. | |
| 5,100,028 A | 3/1992 | Seifert | |
| 5,114,240 A | 5/1992 | Kindt-Larsen et al. | |
| 5,118,291 A | 6/1992 | Varaine | |
| 5,133,458 A | 7/1992 | Miller | |
| 5,152,742 A | 10/1992 | Simpson | |
| 5,154,525 A | 10/1992 | Matsuo | |
| 5,169,030 A | 12/1992 | Lewin | |
| 5,172,807 A | 12/1992 | Dragan et al. | |
| 5,180,242 A | 1/1993 | De Laforcade | |
| 5,208,010 A | 5/1993 | Thaler | |
| 5,236,355 A | 8/1993 | Brizzolara et al. | |
| 5,337,764 A | 8/1994 | McKay | |
| 5,376,006 A | 12/1994 | Fischer | |
| 5,378,226 A | 1/1995 | Hanifl et al. | |
| 5,490,736 A | 2/1996 | Haber et al. | |
| 5,576,591 A * | 11/1996 | Block et al. | 313/25 |
| 5,611,687 A | 3/1997 | Wagner | |
| 5,735,437 A | 4/1998 | Broyles | |
| 5,743,736 A | 4/1998 | Folko | |
| 5,791,801 A | 8/1998 | Miller | |
| 5,853,388 A | 12/1998 | Semel | |
| 6,007,529 A | 12/1999 | Gustafsson et al. | |
| 6,036,005 A | 3/2000 | Krause | |
| 6,039,488 A | 3/2000 | Krawczyk et al. | |
| 6,189,688 B1 | 2/2001 | Aneas | |
| 6,283,933 B1 | 9/2001 | D'Alessio | |
| 6,379,069 B1 | 4/2002 | May | |
| 6,419,414 B1 | 7/2002 | Broyles | |
| 6,425,704 B2 | 7/2002 | Voiers | |
| 6,478,191 B1 | 11/2002 | D'Alessio | |
| 6,516,947 B1 | 2/2003 | Van Dyke | |
| 6,641,319 B2 | 11/2003 | May | |
| 6,655,551 B2 | 12/2003 | Manne | |
| 6,705,790 B2 | 3/2004 | Quintero | |
| 6,755,586 B1 | 6/2004 | Frazier | |
| 6,976,494 B2 | 12/2005 | Wayne et al. | |
| 7,581,899 B2 * | 9/2009 | May et al. | 401/133 |
| 2002/0012563 A1 | 1/2002 | May | |
| 2003/0028156 A1 | 2/2003 | Juliar | |
| 2003/0146115 A1 | 8/2003 | Sharp | |
| 2004/0092883 A1 | 5/2004 | Casey et al. | |
| 2004/0228670 A1 | 11/2004 | Colburn | |
| 2005/0072442 A1 * | 4/2005 | Licari et al. | 132/112 |

FOREIGN PATENT DOCUMENTS

| | | |
|---|---|---|
| DE | 2355057 | 5/1975 |
| DE | 2461617 A1 | 7/1975 |
| DE | 3246406 | 6/1984 |
| EP | 0397589 | 11/1990 |
| EP | 463658 A1 | 1/1992 |
| FR | 1557786 | 1/1969 |
| FR | 2700698 | 7/1994 |
| GB | 409919 | 5/1934 |
| GB | 2287017 | 9/1995 |
| IT | 652178 | 2/1963 |
| JP | 156513 | 6/1994 |
| JP | 9226848 | 9/1997 |
| NE | 8602366 | 4/1988 |
| WO | 88/09753 | 12/1988 |
| WO | 9525948 | 9/1995 |
| WO | 2006/060055 A | 6/2006 |
| WO | 2006060055 A | 6/2006 |

OTHER PUBLICATIONS

Quidel Corporation, Quick Vue In-Line Strep A test, Instruction Literature, 0563112 (Mar. 2002).

International Search Report for PCT/US2005/034291, dated Mar. 17, 2006.

International Search Report and Written Opinion in corresponding PCT Application No. PCT/US/2008/087123 mailed on Jun. 22, 2009.

Non-Final Office Action issued on Sep. 17, 2010 in related U.S. Appl. No. 11/959,136.

* cited by examiner

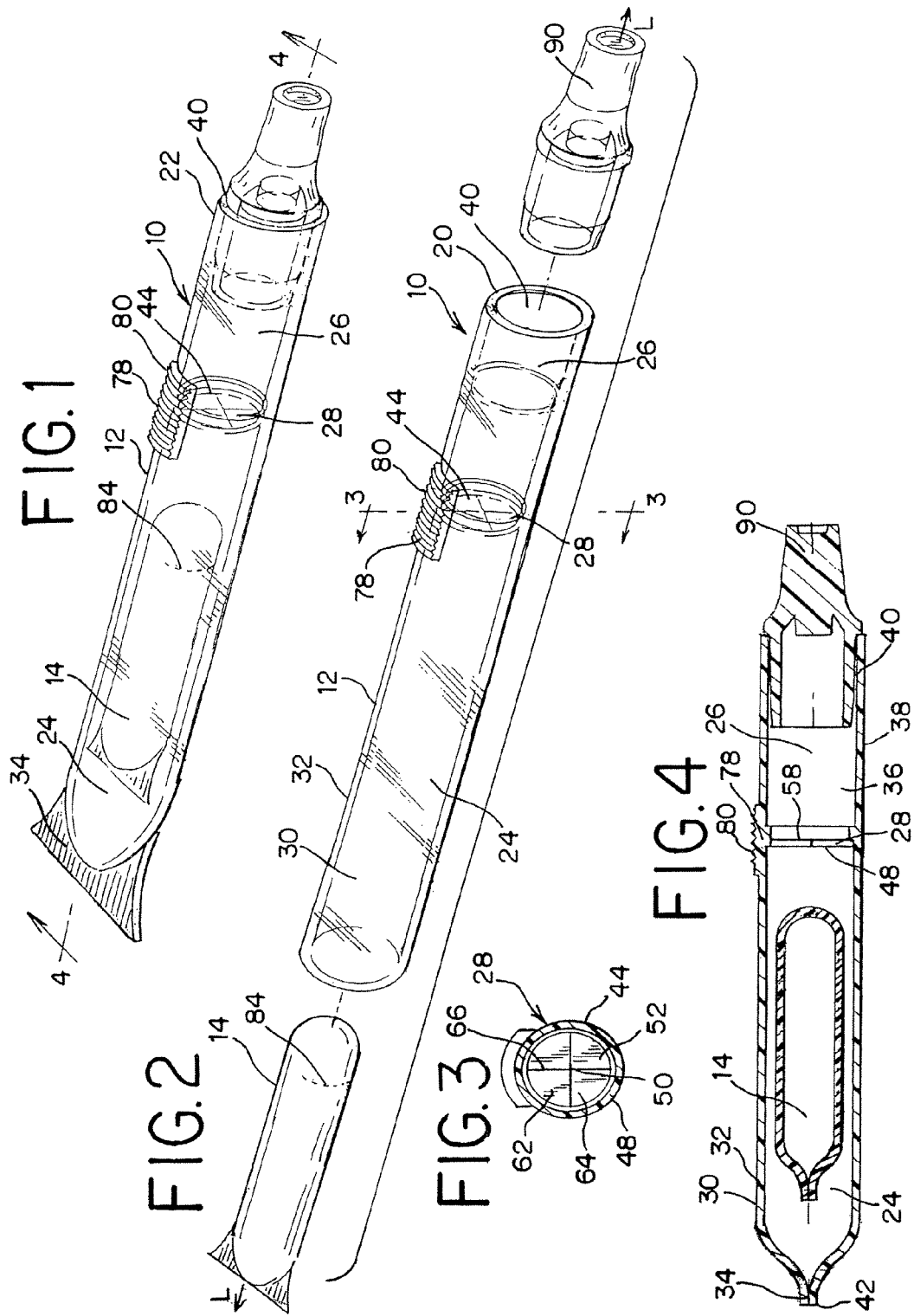

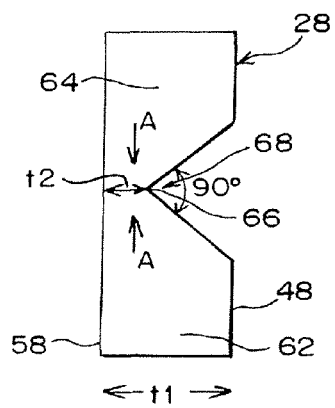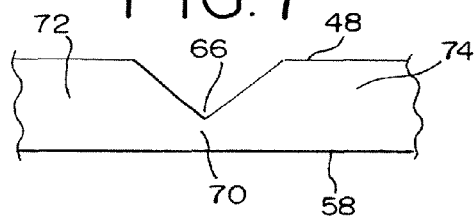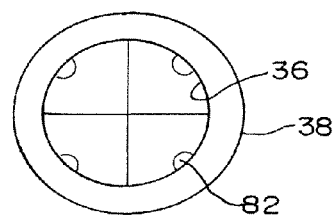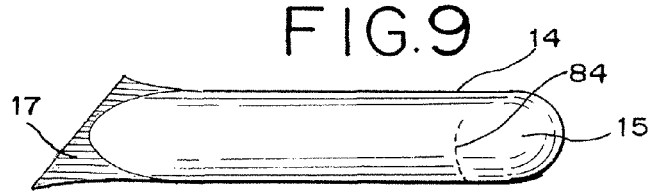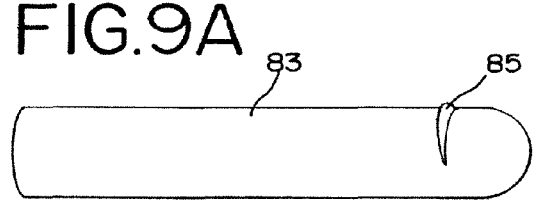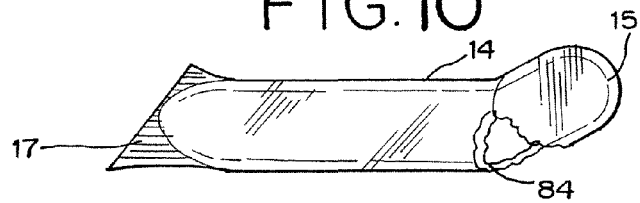

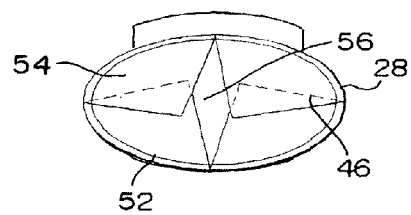
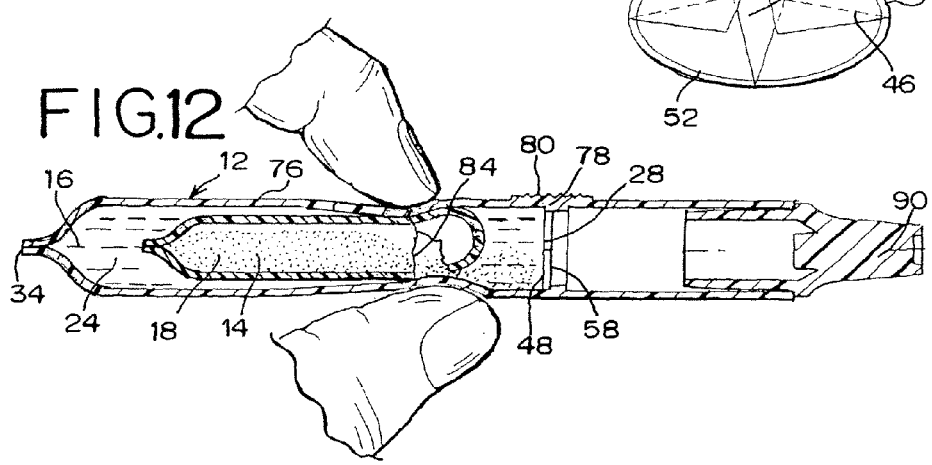
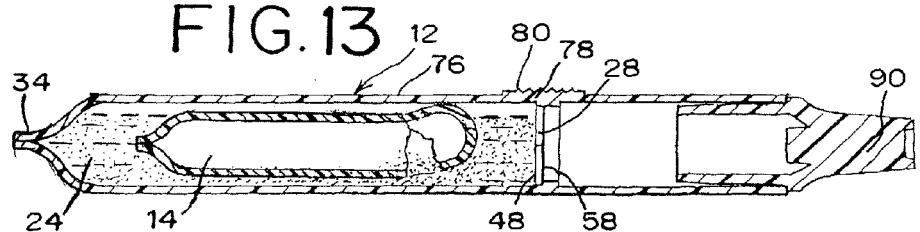
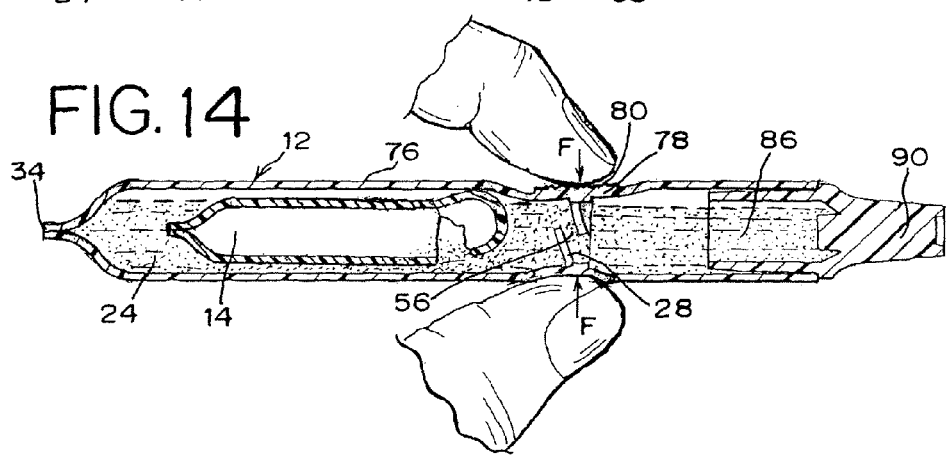

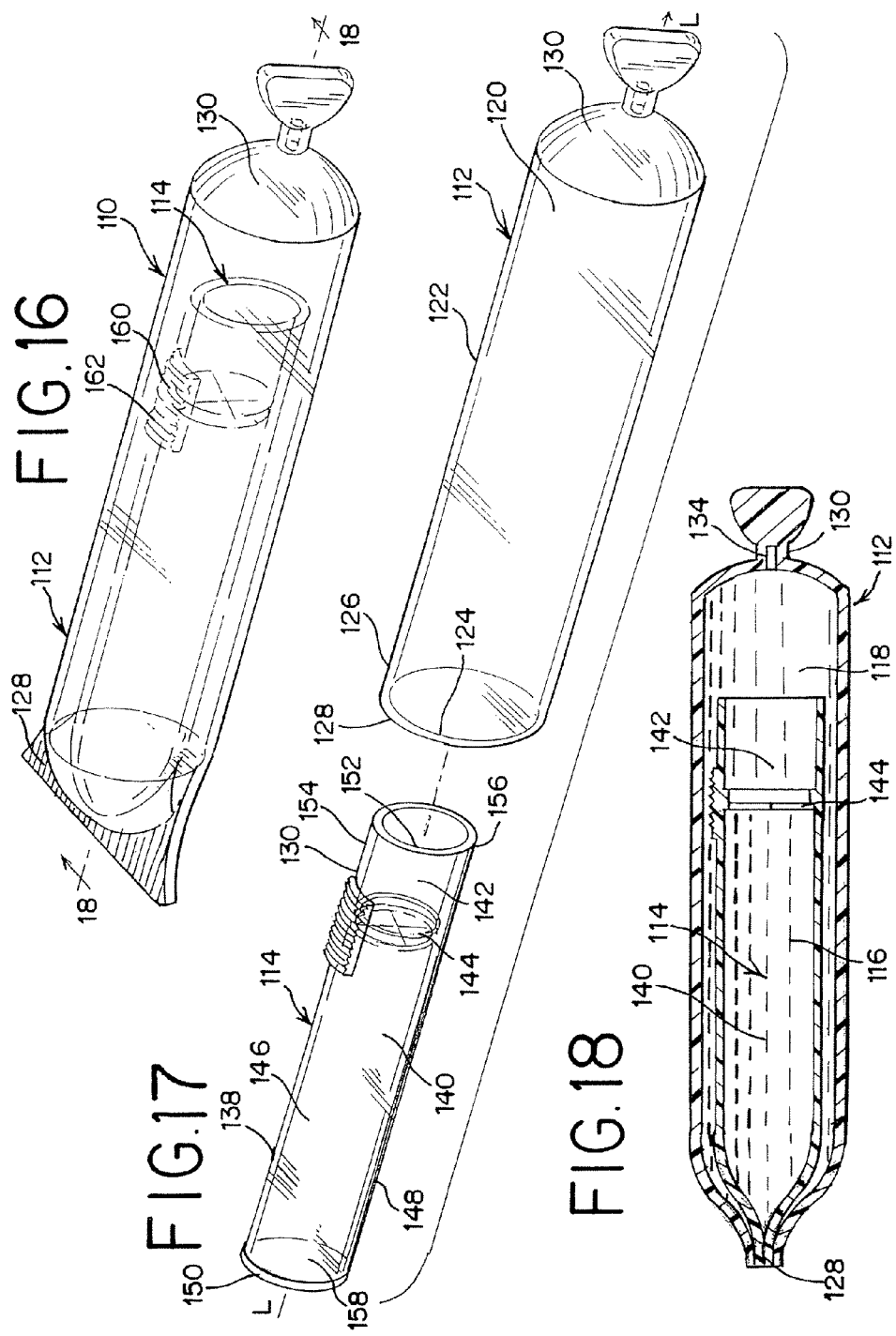

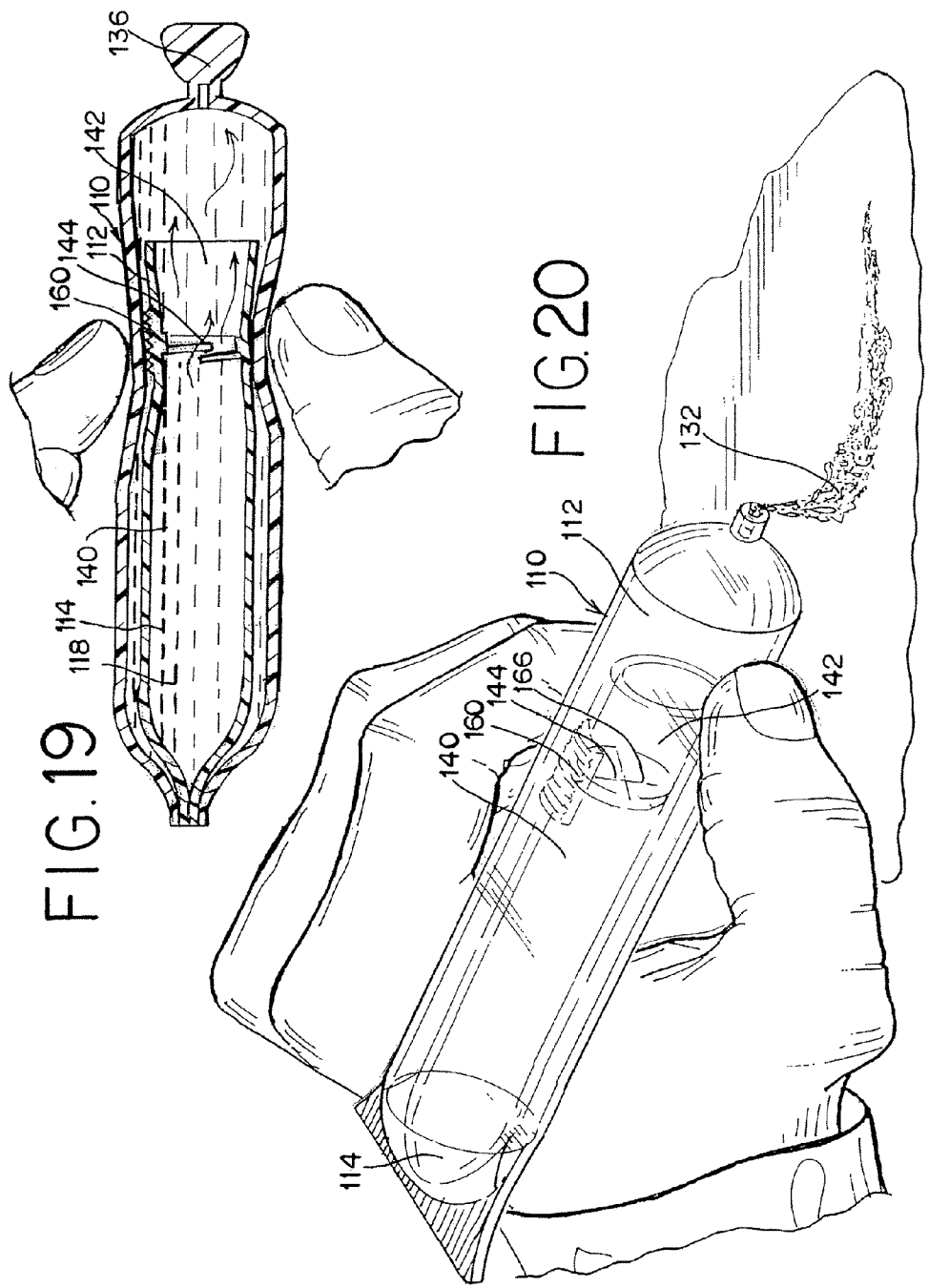

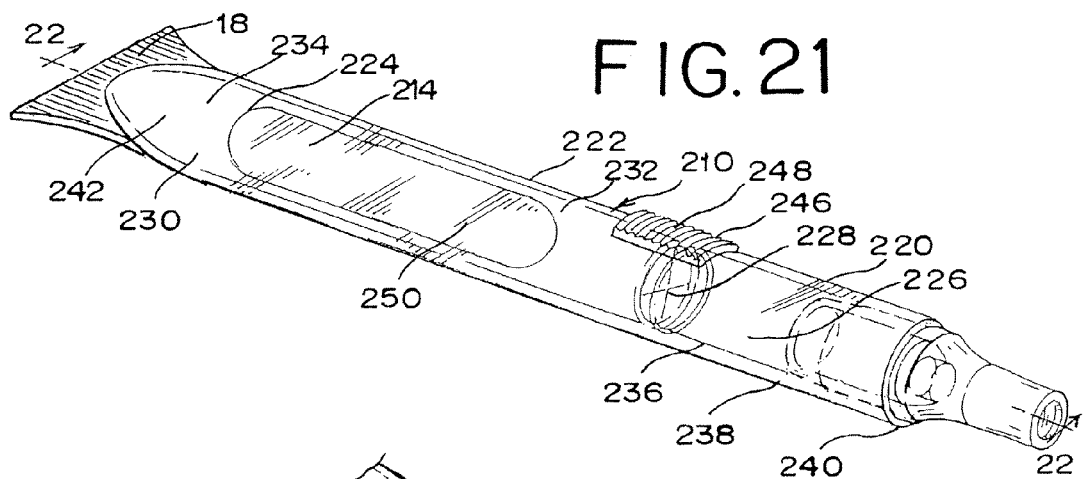
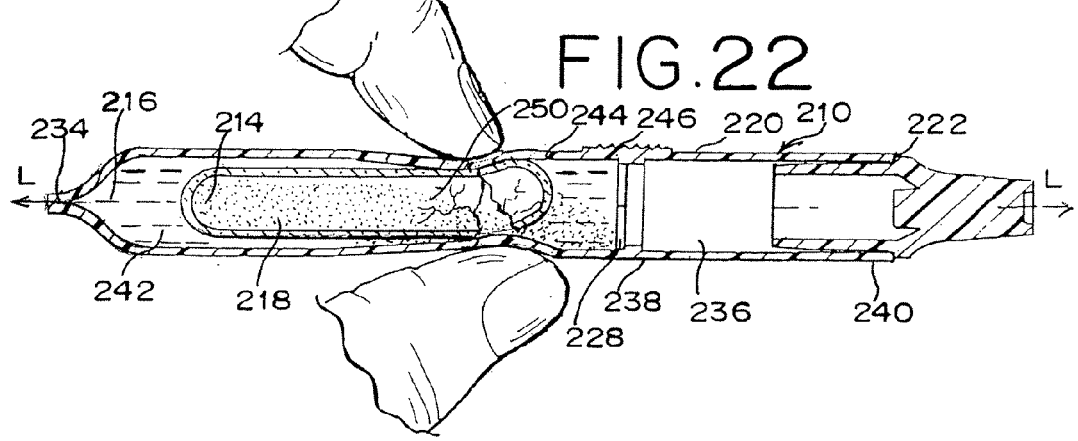
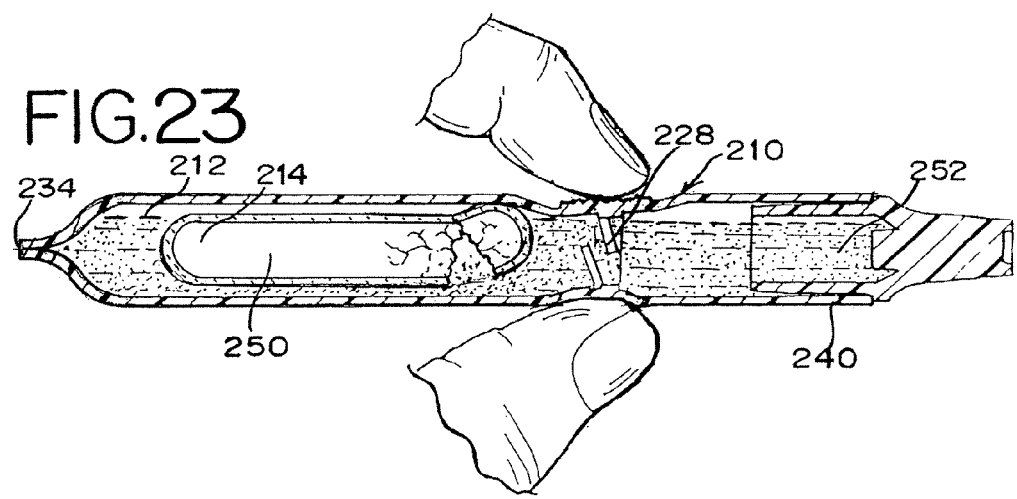

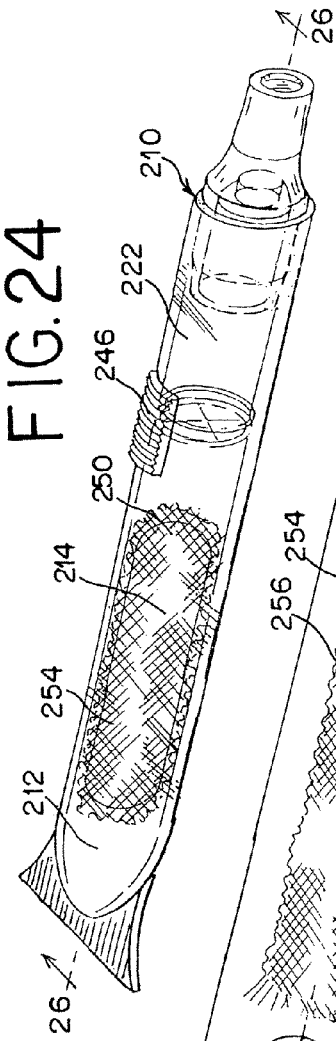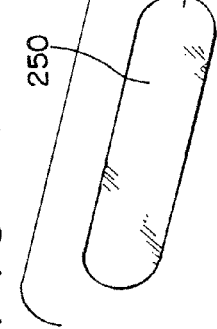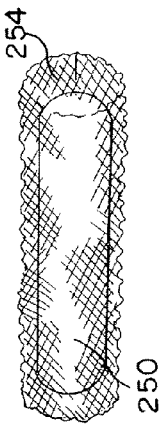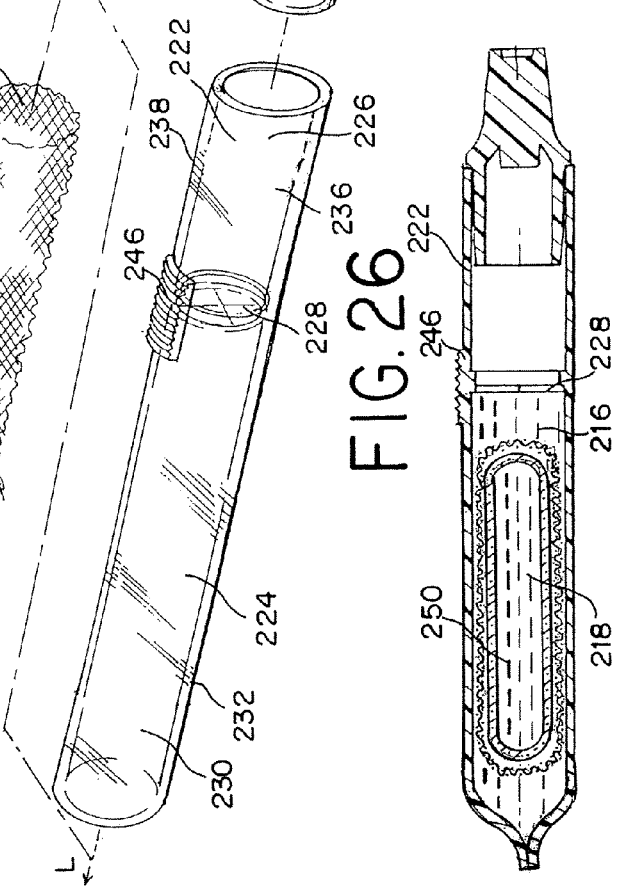

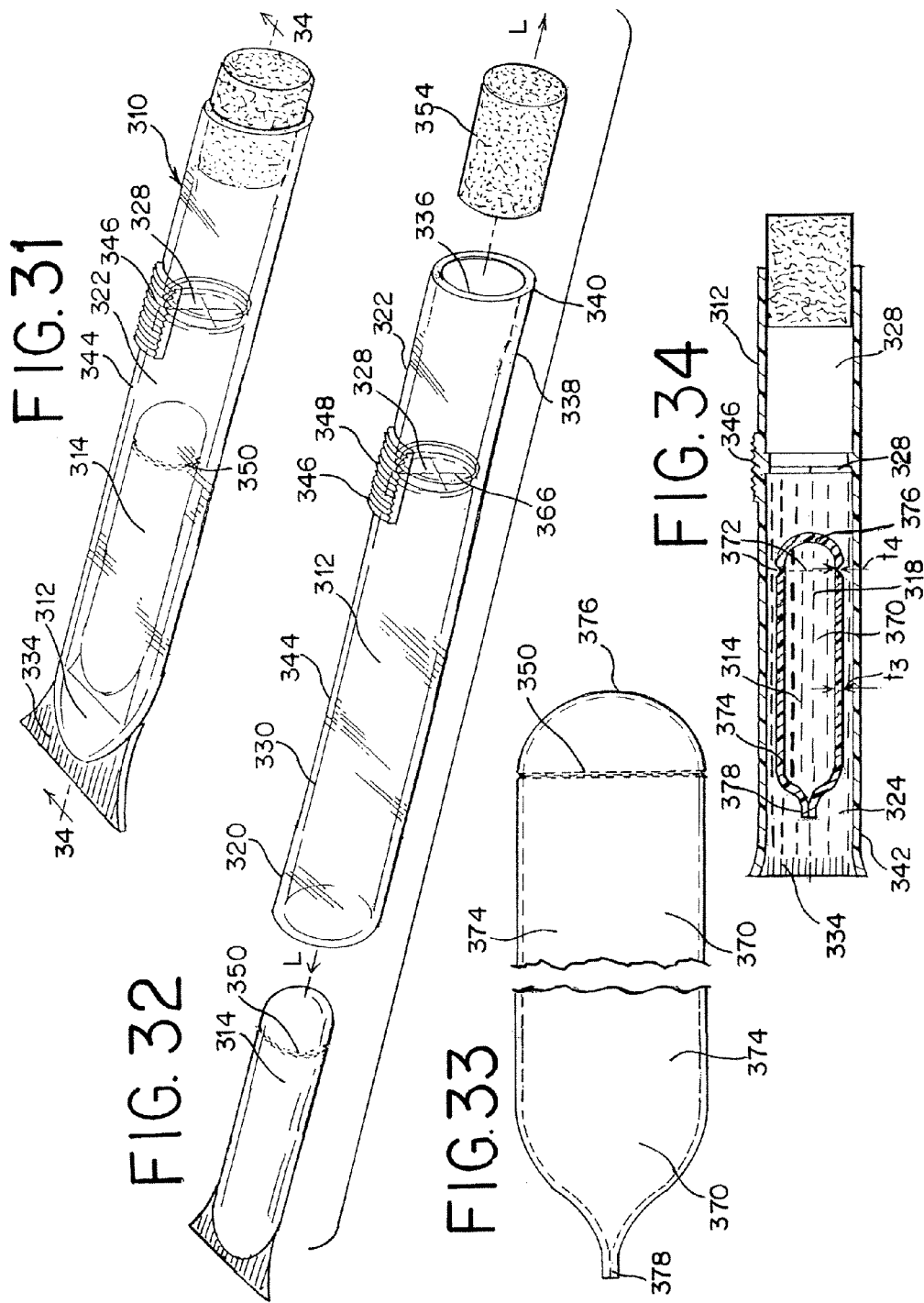

CONTAINER ASSEMBLY

CROSS-REFERENCE TO RELATED APPLICATIONS

None.

FEDERALLY SPONSORED RESEARCH OR DEVELOPMENT

None.

TECHNICAL FIELD

The invention relates to a container assembly wherein container contents can be dispensed therefrom and more particularly, to a tandem packaging container assembly having a first container in operative cooperation with a second container, wherein flowable materials can be dispensed from the assembly.

BACKGROUND OF THE INVENTION

Containers capable of dispensing contents stored in the containers are known in the art. In certain applications, it is desired to mix separately contained materials. Containers may be constructed such that the materials are stored in separate compartments and then mixed together at a desired time. The resulting mixture is then dispensed from the container.

While such containers, according to the prior art, provide a number of advantageous features, they nevertheless have certain limitations. For example, the container materials may have limitations and/or may not be suitably compatible with the flowable substance contained within the containers. The present invention is provided to overcome certain of these limitations and other drawbacks of the prior art, and to provide new features not heretofore available. A full discussion of the features and advantages of the present invention is deferred to the following detailed description, which proceeds with reference to the accompanying drawings.

SUMMARY OF THE INVENTION

The present invention provides a container assembly capable of separately storing a plurality of components that can be mixed at a desired time and then dispensed from the container assembly.

According to a first aspect of the invention, the container assembly has a first container that is configured to hold a first flowable substance, and has a rupturable weld seam in one exemplary embodiment. The container assembly has a second container configured to hold a second flowable substance, and the second container is positioned within the first container. The second container has a rupturable fusion-molded seam. Upon rupturing of the fusion-molded seam of the second container, the second flowable substance mixes with the first flowable substance to define a mixture. Upon rupturing of the weld seam, the mixture is dispensable from the first container.

According to another aspect of the invention, the container assembly has a first container and a second container that is operably associated with the first container. One of the first container or the second container has a weld seam and the other of the first container or the second container is selectively openable. In one preferred embodiment, the first container is an extruded tube, and the second container has a weld seam.

According to another aspect of the invention, the container assembly has a first container configured to hold a first flowable substance, and has a weld seam. The container assembly has a second container configured to hold a second flowable substance, with the second container being selectively openable. The second container is a glass ampoule. Upon opening of the second container, the second flowable substance mixes with the first flowable substance to define a mixture. The weld seam is rupturable and the mixture is dispensable through the weld seam from the first container. According to a further aspect of the invention, the glass ampoule is surrounded by a non-absorbent netting.

According to another aspect of the invention, the container assembly has a first container and a second container. The second container is operably associated with the first container, and the second container has a circumferential weld seam.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 1 is a perspective view of a container assembly of the present invention;

FIG. 2 is an exploded view of the container assembly of FIG. 1 prior to sealing the distal end of the container assembly;

FIG. 3 is a cross-sectional view of a membrane taken along lines 3-3 in FIG. 2;

FIG. 4 is a cross-sectional view of the container assembly taken along lines 4-4 in FIG. 1;

FIG. 6 is an enlarged partial cross-sectional view of a portion of the membrane;

FIG. 7 is a cross-sectional view of a weld line or weld seam taken along lines 7-7 of FIG. 3;

FIG. 8 is an end view of an alternative embodiment of the container assembly having longitudinal ribs;

FIG. 9 is a perspective view of an inner container of the container assembly of FIG. 1;

FIG. 9*a* is a perspective view of a mold member used to make the inner container shown in FIG. 9;

FIG. 10 is another perspective view of the inner container of FIG. 9, showing the inner container in an open position;

FIG. 11 is an end view of the membrane having forces applied thereto wherein the membrane is fractured along mold lines or weld seams;

FIG. 12 is a cross-sectional view as in FIG. 4, depicting a user rupturing the inner container;

FIG. 13 is a cross-sectional view as in FIG. 4, showing the inner container in an open position;

FIG. 14 is a cross-sectional view as in FIG. 4, depicting a user rupturing the membrane of the outer container;

FIG. 16 is a perspective view of another embodiment of a container assembly of the present invention;

FIG. 17 is an exploded view of the container assembly of FIG. 16 prior to sealing the distal end of the container assembly;

FIG. 18 is a cross-sectional view of the container assembly taken along lines 18-18 in FIG. 16;

FIG. 19 is a cross-sectional view as in FIG. 18 depicting a user rupturing the inner container;

FIG. 20 is a perspective view of a user dispensing material from the container assembly;

FIG. 21 is a perspective view of another embodiment of a container assembly of the present invention;

FIG. 22 is a cross-sectional view taken along lines 22-22 in FIG. 21 depicting a user rupturing an inner container;

FIG. 23 is a cross-sectional view as in FIG. 22 depicting a user rupturing the container;

FIG. 24 is a perspective view of another embodiment of a container assembly of the present invention;

FIG. 25 is an exploded view of the container assembly of FIG. 24 prior to sealing the distal end of the container assembly;

FIG. 26 is a cross-sectional view of the container assembly taken along lines 26-26 in FIG. 24;

FIG. 27 is a perspective view of an inner container of FIG. 24;

FIG. 31 is a perspective view of another embodiment of a container assembly of the present invention;

FIG. 32 is an exploded view of the container assembly of FIG. 31 prior to sealing the distal end of the container assembly;

FIG. 33 is a side elevation view of an inner container of the container assembly of FIG. 31;

FIG. 34 is a cross-sectional view of the container assembly taken along lines 34-34 in FIG. 31;

DETAILED DESCRIPTION

Figure 5A:
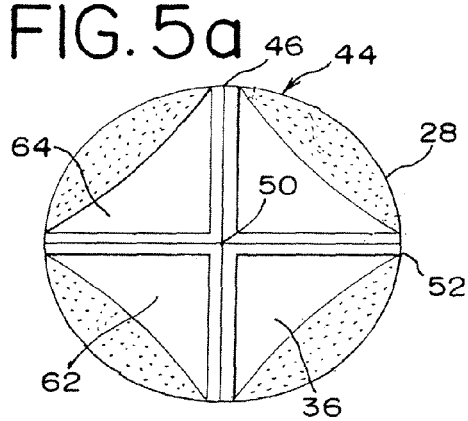
FIGS. 5*a*-5*f* are a series of views showing the injection molding process of the membrane wherein adjacent mold segments abut to form weld lines, or weld seams.
Figure 5B:
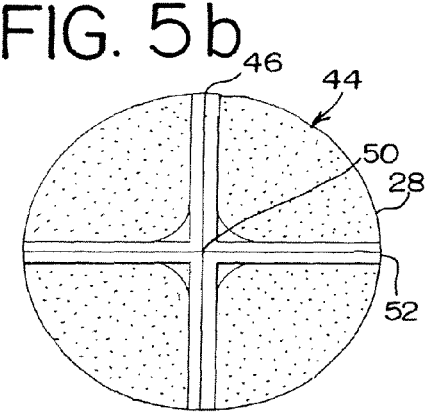
Figure 5C:
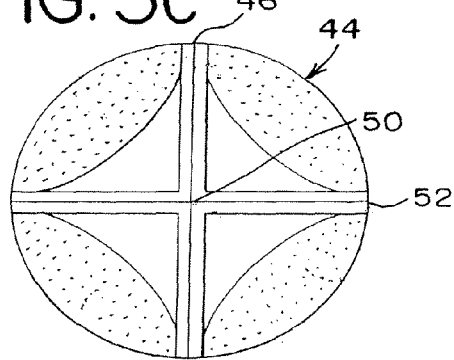
Figure 5D:
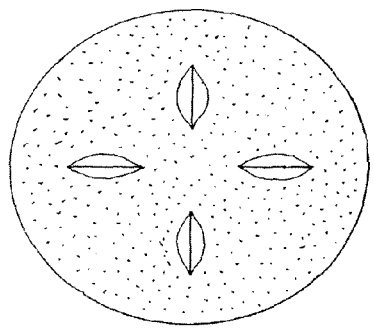
Figure 5E:
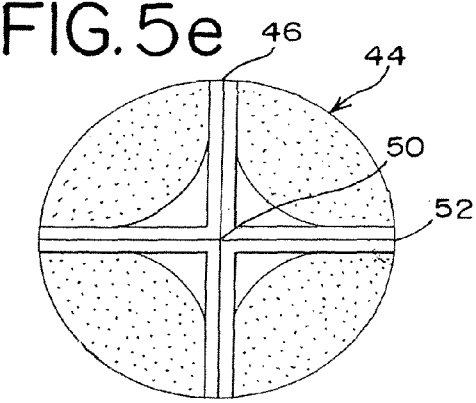
Figure 5F:
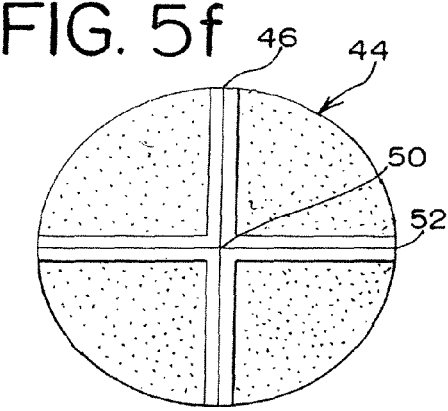

While this invention is susceptible of embodiments in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

The following embodiments generally include multiple containers operably associated with one another. It will be understood that in many preferred embodiments, a first container and a second container are disclosed. This may be referred to as a container assembly or tandem container assembly. Additional containers could also be utilized while still being considered a container assembly or tandem container assembly. In addition, "first" and "second" etc. designations could be interchanged as desired. Furthermore, the various features of the several different embodiments can be combined as desired.

Referring to the drawings, FIG. 1 discloses a container assembly 10 according to the present invention. FIG. 2 shows the container assembly 10 prior to having one end sealed as will be described in greater detail below. As shown in FIG. 2, the container assembly 10 generally comprises a first container 12 and a second container 14, operably associated with one another. The container assembly 10 is configured to hold a first flowable substance 16 and a second flowable substance 18 (FIG. 13). The container 12 has an elongated axis L and further has a peripheral wall or outer wall 20. In one preferred embodiment, the first container 12 is cylindrical. However, the first container 12 can be molded in numerous shapes, including an elliptical shape.

As further shown in FIGS. 1 and 2, the first container 12 of the container assembly 10 may be a plastic ampoule 22. The first container 12 is configured to hold the first flowable substance 16. The first container 12 generally comprises a first chamber 24 and a second chamber 26 separated by a membrane or web 28 described in greater detail below. While a two-chamber dispenser is one preferred embodiment, more or less chambers can also be defined within the first container 12. As shown in FIG. 4, the first chamber 24, which is adapted to contain the material to be dispensed, has an interior surface 30, an exterior surface 32, and a distal end 34. FIG. 4 also shows, the second chamber 26 having an interior surface 36, an exterior surface 38, and a proximate end 40. An end portion 42 is located on the exterior surface 32 of the first chamber 24 at the distal end 34. As explained in greater detail below, the distal end 34 of the first chamber 24 can be closed by a number of sealing methods, including heat or adhesive sealing. Alternatively, the distal end 34 can receive a cap to close the first chamber 24. When the distal end 34 is sealed, and in cooperation with the membrane 28, the first chamber 24 is a closed chamber for holding the first flowable substance 16 such as a liquid medicinal fluid. If desired, the first container 12 can be necked down wherein the second chamber 26 has a smaller diameter than the diameter of the first chamber 24.

As shown in FIGS. 3 and 5a-5f, the membrane 28 is formed as an integral part of the first container 12 in an injection molded process described in greater detail below. The membrane 28 formed is similar to the membrane structure disclosed in U.S. Pat. No. 6,641,319, which is incorporated by reference herein. The membrane 28 is preferably constructed in the form of a disk 44. The disk 44 is preferably a flat plastic sheet having a series of radial depressions 46 on a first surface 48 of the membrane 28. The radial depressions 46 extend from substantially a center point 50 of the membrane 28 to an outer edge 52 of the disk 44, for example, in the form of spokes of a wheel. Compression of the first container 12 at the membrane 28, such as by finger pressure, causes the membrane 28 to break, rupture, or fractionate only along the radial depressions 46 forming a series of finger-like projections 54 which are displaced in overlapping fashion (FIG. 11) to create membrane openings 56 for release of the material from the first chamber 24 to the second chamber 26. Since the projections 54 are "pie-shaped" and widest at their outer edges 52, the center section of the membrane 28 breaks open the widest. The amount of material that can be dispensed through the membrane 28 is controlled by the degree of the opening 56. The size of the opening 56 is controlled by the configuration of the radial depressions 46 and the pressure of the fingers of the user pressing on the first container 12 to assert pressure on the membrane 28.

As further shown in FIGS. 1 and 2, the membrane 28 partitions the first container 12 to separate and, therefore, define the first chamber 24 and the second chamber 26. Although FIGS. 1 and 2 show the membrane 28 closer to the proximate end 40 than the distal end 34, the placement of the membrane 28 is a function of the desired volume capacity of the first chamber 24 and the second chamber 26. As such, the membrane 28 could be located at numerous locations in the first container 12.

As shown in FIG. 4, the membrane 28 has a first surface 48 and a second surface 58. The first surface 48 faces towards the first chamber 24, while the second surface 58 faces towards with the second chamber 26. The second surface 58 is substantially planar. The first surface 48, however, has a plurality of bands, mold seams, weld lines or weld seams 66 thereon that generally correspond to the radial depressions 46. Also in a preferred embodiment, the membrane 28 is disposed substantially transverse to the elongated axis L of the first container 12. As will be described in greater detail below, and as generally shown in FIGS. 6 and 7, a first segment 62 of injected molded material abuts a second segment 64 of injected molded material to form the weld seam 66. The weld seams 66 are positioned in the membrane 28. As can be further seen in FIG. 6, the membrane 28 has a base thickness "t1" between the first membrane surface 48 and the second membrane surface 58. The thickness t1 is generally referred to as the membrane thickness. The weld seam 66 has a thickness t2 that is less than the membrane thickness t1. This facilitates rupture of the membrane 28 as described below. The first mold segment 62 and the second mold segment 64 abut to form the weld seam 66. During the molding process, the mold segments 62, 64 move toward the interface area 68 in the directions of arrows A. Furthermore, the mold segments 62, 64 meet substantially at the interface area 68 at the lesser thickness t2. This forms the weld seam 66 at the lesser thickness facilitating rupture of the membrane 28. If the mold segments 62, 64 did not meet at the interface area 68 but, for example, substantially further to either side of the interface area 68, the weld seam 66 would be too thick and not be able to rupture. Whichever mold segment 62, 64 moved past the interface area 68, the segment would merely flex and not rupture as desired. Thus, as described below, the molding process is controlled to insure that the mold segments abut substantially at the interface area 68 to form the weld seam 66 having a thickness t2 less than the membrane thickness t1.

As shown in FIG. 3, the membrane 28 preferably contains the plurality of weld seams 66, which can be arranged in a number of configurations including but not limited to a cross, star, or asterisk. It is understood, however, that the benefits of the invention can be realized with a single weld seam 66 formed from a pair of mold segments abutting one another. In one preferred embodiment, the weld seams 66 are arranged in an asterisk configuration wherein the membrane 28 has a pie-shape. Adjacent mold segments 62, 64 abut with one another to form the weld seams 66. Due to the configuration of the mold to be described below, the weld seams 66 are formed to have a lesser thickness t2 than the membrane thickness t1. As further shown in FIGS. 2 and 3, the plurality of weld seams 66 extend radially from substantially a center point 50 on the membrane 28 completely to an outer edge 52 of the membrane 28 and to the interior surface of the first container 12. It is understood, however, that the weld seams 66 do not need to extend to the outer edge 52 of the membrane 28. In a most preferred embodiment, the membrane 28 has four mold segments 62, 64. The mold segments cooperate wherein adjacent mold segments abut at separate interface areas 68 to form the weld seams 66. In one preferred embodiment, the membrane has four sections with four weld seams. It is understood the number of weld seams 66 can vary. As shown in FIG. 6, the process is controlled such that the adjacent mold segments each meet at the separate interface areas 68. Each weld seam 66 has a thickness less than the thicknesses of the segments. The thicknesses of the mold segments are considered to be the membrane thickness t1.

Explained somewhat differently, FIG. 7 shows the first surface 48 of the membrane 28 has a channel 70 formed therein. The weld seam 66 confronts the channel 70. The channel 70 is formed by a first wall 72 adjoining a second wall 74. In a preferred embodiment, the first wall 72 adjoins the second wall 74 at substantially a 90 degree angle. Acute angles or obtuse angles are also possible. Thus, in one preferred embodiment, the channels are V-shaped.

As shown in FIGS. 12-15, the exterior surface 76 of the first container 12 has an exterior extension 78 to indicate the exact location where force should be applied to rupture the membrane 28. Specifically, the extension 78 is located directly adjacent to the membrane 28. Although the extension 78 is shown as a thumb pad with a plurality of ridges 80, any type of raised area or projection including a button, prong or ring will suffice. In addition, a ring of material could be applied around the perimeter of the first container 12 corresponding to the location of the membrane 28 so that a user would know precisely where to apply finger pressure. An indicia-bearing marking would also be sufficient.

In an alternative embodiment, the interior surface 36 of the second chamber 26 has a circumferential rib 88. The circumferential rib 88 cooperates with a variety of applicators 90. The circumferential rib 88 may also comprise a plurality of ribs. As shown in FIG. 8, the interior surface 36 of the second chamber 26 may have a plurality of longitudinal ribs 82. The ribs 82 are oriented axially in the second chamber 26 and can be of varying length. The ribs 82 could be shortened and extend radially inwardly. The circumferential rib 88 or longitudinal ribs 82 secure different applicators 90, such as a swab, a dropper, a brush, or a brush assembly (FIG. 2), which can be used to apply the dispensed liquid or solid material. The applicator 90 forms an interference fit with the circumferential or longitudinal ribs.

In one preferred embodiment, the applicator 90 engages the interior surface 36 of the second chamber 26 and in particular the longitudinal ribs 82 to form an interference fit. Once the membrane 28 is fractured as described below, the applicator 90 receives the mixture 86 as it is dispensed from the second chamber 26. The applicator 90 could have a contact surface that is used to dab a desired area such as a skin surface having an insect bite. The container assembly 10 can be inverted and squeezed until the applicator surface, such as a swab, is wet. The container assembly 10 can then be held in a vertical position with the applicator 90 pointed upwardly. Alternatively, the applicator 90 can be made of a material of relatively large porosity for passing droplets through the applicator 90 by gravity and for dispensing droplets from its exterior surface. The applicator 90 can be made of polyester, laminated foamed plastic, cotton or the like. In one preferred embodiment, the applicator 90 could be a dropper.

The method of making the first container 12 of the container assembly 10 is generally illustrated in detail in U.S. Pat. No. 6,641,319, which was expressly incorporated by reference. A brief explanation is provided. The first container 12 is produced in a single molding operation thus providing a one-piece injected-molded part. As shown in U.S. Pat. No.

6,641,319, a mold is provided having a mold cavity therein. The mold cavity is dimensioned to correspond to the exterior surface of the first container 12. Core pins are provided within the mold as is known.

A second core pin has a generally planar end face. However, the first core pin has an end face having the raised structures thereon. The raised structure is in the form of a ridge. The ridge is what provides for the depressions or weld seams 66 at the certain thickness in the membrane 28. Furthermore, in one preferred embodiment, the ridge comprises a plurality of ridges radially extending substantially from a center point of the end faces. The ridges define a plurality of membrane segments, or mold gaps, between the ridges. Thus, it can be understood that the raised structure in the form of the ridges provides the corresponding structure of the membrane 28. The ridges can be formed in a number of shapes, including square or rounded. In addition, the ridges can be arrayed in a multitude of shapes, including a single line, a cross, a star, or an asterisk.

The first core pin is inserted into the mold with the raised structure facing into the mold cavity. A first space is maintained between the mold and the length of the first core pin. The second core pin is also inserted into the mold cavity wherein a second space is maintained between the mold and the second core pin. The core pins are generally axially aligned wherein the end face of the first core pin confronts the end face of the second core pin in spaced relation. Thus, a membrane space is defined between the respective end faces of the core pins. End plates are installed on end portions of the mold to completely close the mold. An exterior extension cavity is located on the surface of the mold and adjacent to a membrane space.

As will be understood, molten thermoplastic material is injected into the mold cavity through an inlet. The material flows into the first space, second space, and membrane space. The plastic injection is controlled such that the plastic enters the membrane space simultaneously in the circumferential direction. The raised structures separate the material into separate mold segments that flow into the mold gaps. The mold segments 62, 64 flow first into the wider portions of the mold gaps as this is the area of least resistance. The material continues to flow into the membrane space and then the adjacent mold segments 62, 64 abut at the interface area 68 to form the weld seams 66. The weld seams 66 have a lesser thickness than the membrane thickness. The first raised structure of the first core pin forms the first weld seam. During this process, air is vented from the mold cavity as is conventional.

Once the plastic injection is complete, the material is allowed to cool. A cold water cooling system could be utilized wherein cold water is pumped into the mold outside of the cavity if desired. Once cooled, the first container 12 can be removed from the mold.

In a preferred embodiment, the first container 12 is made of a transparent, flexible thermoplastic material. The preferred plastic material is polyethylene or polypropylene but a number of other plastic materials can be used. For example, low-density polyethylene, polyvinyl chloride or nylon copolymers can be used. In a preferred embodiment, a mixture of polypropylene and polyethylene copolymer or thermoplastic olefin elastomer is used. In another preferred embodiment, a mixture of polypropylene and Flexomer®, available from Union Carbide, is utilized. It is essential that the dispenser be made of material which is flexible enough to allow sufficient force to rupture or fracture the membrane 28. Additionally, it is possible for the first container 12 to be a one-piece injection molded container wherein the membrane 28 is integral with the container 12.

As further shown in FIG. 1, the second container 14 of the container assembly 10 is positioned within the first container 12. In one preferred embodiment, the second container 14 is positioned within the first chamber 24 of the first container 12. The second container 14 is configured to hold the second flowable substance 18.

FIGS. 9 and 10 disclose the second container 14 in greater detail. The second container 14 has a general tubular shape defining a cavity therein. The second container 14 has a first end 15 and a second end 17 that is sealed after the second flowable substance 18 is injected into the second container 14. Between the first end 15 and the second end 17, the second container 14 has a rupturable or fractionable seam 84. The rupturable seam 84 can be provided in various forms. In one preferred embodiment, the rupturable seam 84 is a fusion-molded seam 84 that is formed from methods described in greater below such as dip molding or rotational molding. It is further understood that the second container 14 can be provided with several different types of opening structures. The fusion-molded seam 84 is generally formed along a circumference of the second container 14. The seam 84, however, does not extend around a full periphery of the second container 14. The seam 84 has a wall thickness less than the overall thickness of the wall structure of the second container remote from the seam 84. The seam 84 forms a weakened section of the second container 14 wherein force can be applied at the seam 84 wherein the seam 84 ruptures. Upon rupture, the second flowable substance 18 can flow from the cavity and out of the second container 14. The rupturing of the seam 84 will be described in greater detail below.

As discussed, in one preferred embodiment, the second container 14 has the fusion-molded rupturable seam 84 formed by a dip molding process. FIG. 9a is generally referenced regarding the dip molding process. The dip molding process is a precision thermal process which allows the formation of components that follow the exact negative details of a mold or mandrel. As shown in FIG. 9a, a first mold member 83 is provided and in an exemplary embodiment, is in the form of a mandrel 83. The mandrel may be made from finished and polished steel bar stock. The mandrel 83 is shaped similarly to the second container 14 of FIG. 9. The mandrel 83 has a projected ridge 85 on its peripheral surface that will help form the fusion-molded seam 84. In the process, a second member is also utilized in the form of a reservoir capable of holding a liquefied polymeric material that will form the second container 14.

The mandrel 83 is preheated and a supply of liquefied polymeric material is provided in the reservoir (not shown). The mandrel 83 is then dipped into the first mold member wherein the polymeric material conforms or "gels" onto the mandrel 83. Temperature, time, and material type contribute to the wall thickness of the second container 14. It is understood that because of the ridge 85 on the mandrel 83, a weakened section of lesser thickness is formed thus defining the fusion-molded seam 84. Once the desired material thickness is gelled onto the mandrel 83, the mandrel 83 is removed from the reservoir. The mandrel 83 with material thereon is then inserted into an oven. The oven provides heat at an appropriate temperature to cure the material. Once the curing process is complete, the mandrel 83 and material are cooled and then the material is stripped from the mandrel 83. In one form, the material is blown off the mandrel 83 such as with the use of compressed air supplied to the mandrel 83. It is understood that the mandrel 83 can have suitable structure and connections for this purpose. Once the material is removed from the mandrel 83, the second container 14 is thereby formed such as shown in FIG. 10. It is understood that the ridge 85 provides for a portion of the wall thickness of the container 14 to be reduced. Thus, the ridge 85 provides the weakened area for the fusion molded seam 84. The fusion molded seam 84 corresponds to this reduced thickness area on the wall. The first end of the second container 14 is generally rounded that matches the end of the mandrel shape. The second end of the second container 14 remains open and defines the opening into the cavity of the second container 14 defined by the walls of the second container 14. After this molding process, the second container 14 can be trimmed as desired. As discussed, the second container 14 is directed to a filling station where it is filled with the second flowable substance 18. Once filled, the second end of the second container 14 is sealed by any known means. The second flowable substance 18 is then contained within the second container 14.

It is understood that the shape of the mandrel 83 used to form the second container 14 can take various forms. The dip molding process can also be carried out in an automated process. Finally as discussed in greater detail below, the liquefied polymeric material can take various forms as known to those skilled in the art.

Another process known as rotational molding, rotocasting, or slush molding can be used for manufacturing the second container 14 in order to achieve a part having a fusion molded seam 84. The basic steps of rotational molding include: 1) mold charging; 2) mold heating; 3) mold cooling; and 4) part ejection. A hollow mold member is first provided that defines an inner mold surface. An amount of liquefied polymeric material is introduced into the hollow mold member. The hollow mold member is heated to generally maintain the material at a desired temperature. The hollow mold member is then rotated along two separate axes at a low speed. This causes the polymeric material to move along and adhere to the inner mold surface. Movement of the material is due to gravity and not centrifugal force. The process is continued and the material solidifies on the inner mold surface to its desired shape. Once the material is sufficiently solidified, rotation of the mold member is stopped to allow for the container 14 to be removed from the mold. This process can then be repeated.

The advantages of rotational molding are that there are relatively low levels of residual stresses in the parts formed. The mold members used in rotational molding are also generally inexpensive.

While two methods of forming a fusion-molded seam are discussed above, it is contemplated that a fusion-molded seam may also be formed using other processes. These processes include spin casting or centrifugal casting, structural blow molding or thermoforming.

In a preferred embodiment, the second container 14 is made of a transparent, flexible thermoplastic material. While a number of different plastics may be used, the preferred plastics material are polyvinyl chloride (PVC), plastisol (vinyl compound), polyethylene (LLDPE, LDPE, MDPE, HDPE), cross-linked polyethylene (XDPE), polycarbonate, nylon, polypropylene (PP), unsaturated polyester, ABS, or polystyrenes.

FIGS. 1 and 2 provide an understanding of the overall assembly of the container assembly 10. The container assembly 10 is constructed by first providing the second container 14 which can be passed on to a filling apparatus. The second container 14 is filled with a second flowable substance 18, and then the second end of the second container 14 is sealed by heat sealing dies. The excess end portion can then be cut-off and discarded. It is understood that heat sealing is one preferred seal while other sealing methods could also be utilized. The second container 14 may be suitably cleaned or sterilized before and after the filling process as may be required for the particular application of the container assembly 10. The second container 14 is then placed into the first container 12 as shown in FIG. 2. After placing the second container 14 into the first container 12, the first container 12 is then passed on to another filling apparatus. The first container 12 is filled with a first flowable substance 16. As shown in FIG. 4, the distal end 34 of the first container 12 is also sealed by heat sealing dies. The excess portion can then be cut-off and discarded. As mentioned above, it is understood that heat sealing is one preferred seal, while other sealing methods could be utilized.

FIGS. 12-14 disclose the overall operation of the container assembly 10. Suitable compression of the first container 12, such as by finger pressure, causes the fusion-molded seam 84 of the second container 14 to break, rupture, or fractionate only along the fusion-molded seam 84 to create an opening for release of the second flowable substance 18 from the second container 14. The second flowable substance 18 then flows into the first chamber 24. The second flowable substance 18 then mixes with the first flowable substance 16 in the first chamber 24 of the first container 12 to define a mixture 86. The container assembly 10 can be shaken if necessary.

Figure 15:
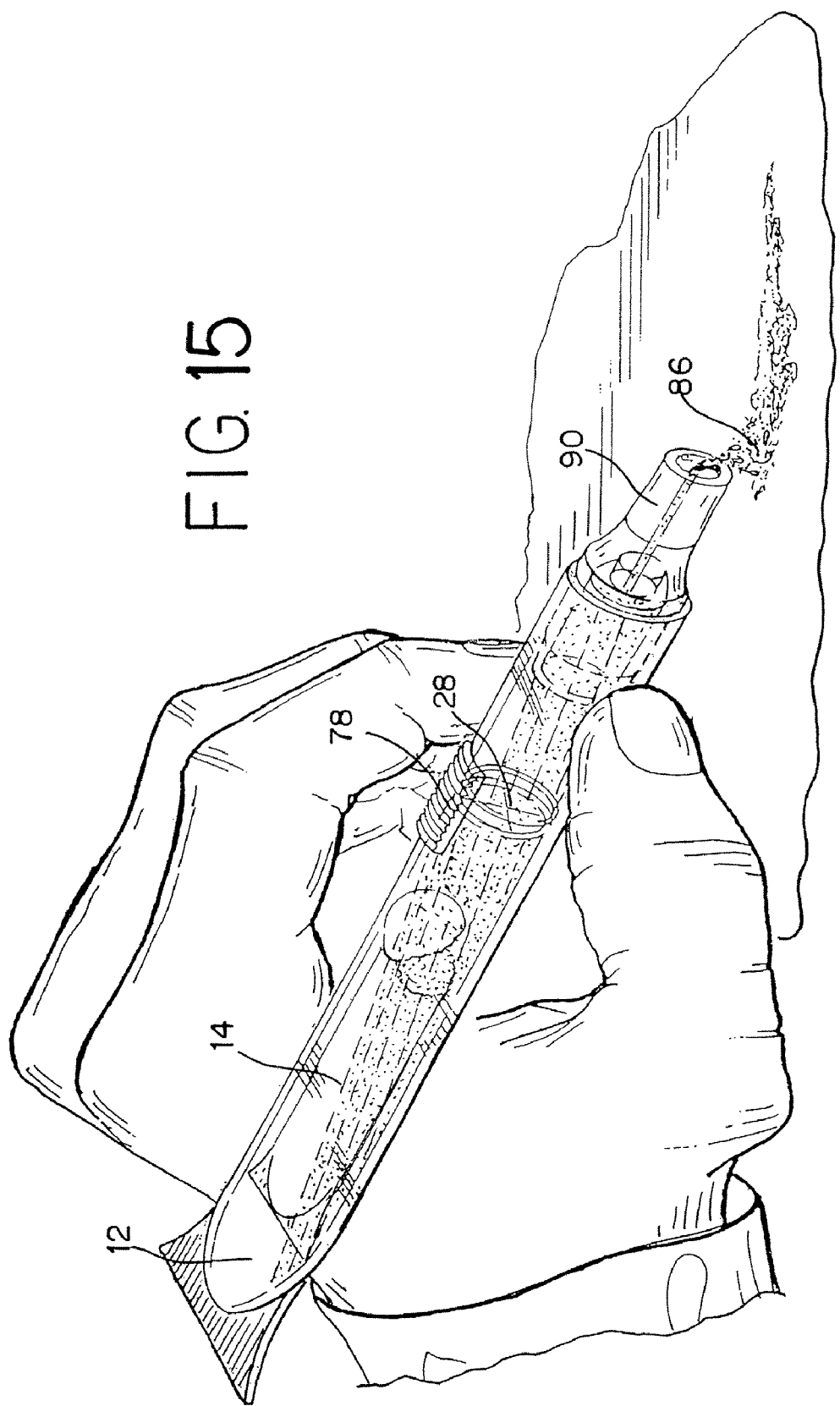
FIG. 15 is a perspective view of a user dispensing material from the container assembly.
Figure 28:
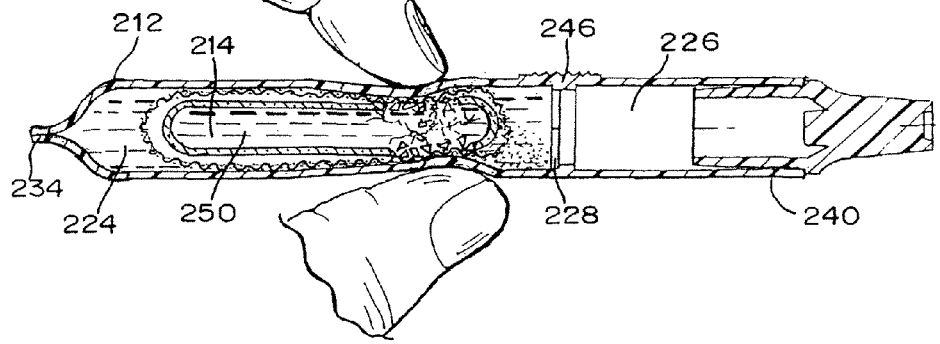
FIG. 28 is a cross-sectional view as in FIG. 26 depicting a user rupturing the inner container.
Figure 29:
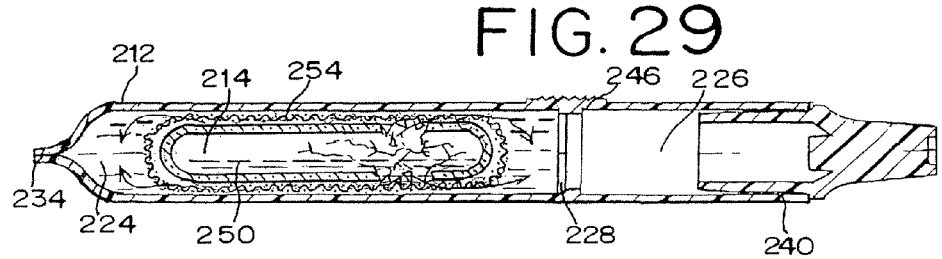
FIG. 29 is a cross-sectional view as in FIG. 26 of the inner container rupturing wherein a first flowable substance mixes with a second flowable substance.
Figure 30:
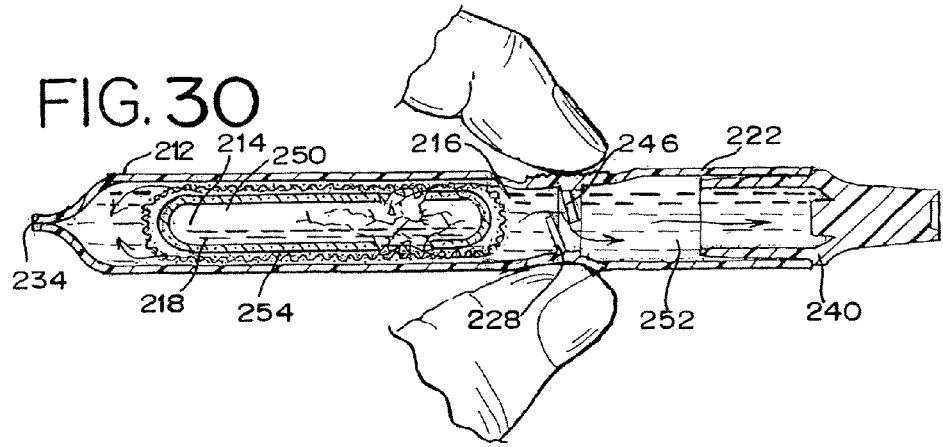
FIG. 30 is a cross-sectional view as in FIG. 26 depicting a user rupturing the outer container.

As shown in FIGS. 14-15, in further operation the user applies a selective force F on the container assembly 10 at the exterior extension 78 adjacent to the membrane 28. When sufficient force is applied, lateral pressure is applied to the membrane 28 causing the membrane 28 to shear and rupture along the weld seams 66. The membrane 28 ruptures only along the weld seams 66 to create membrane openings 56. Upon rupture of the membrane 28, material passes from the first chamber 24 through the membrane 28 and into the second chamber 26. The material flow rate through the membrane 28 and into the second chamber 26 is controlled by the degree of membrane opening 56 which is directly related to the amount of force applied to the membrane 28 by the user. Therefore the user can precisely regulate the flow of material after rupture of the membrane 28. In addition, the membrane 28 can preferably have elastic characteristics wherein when force is removed, the membrane 28 returns substantially to its original position. While the weld seams 66 may be ruptured, the segments 62, 64 can form a close enough fit to prevent material from flowing past the membrane 28 without additional pressure on the material. Thus the membrane 28 can act as a check valve to prevent unwanted discharge of the material. As shown in FIG. 15, the mixture 86 is then dispensed from the first container 12 by applying the appropriate manipulation to the applicator 90. As shown in the one preferred in FIG. 2, the applicator 90 is a dropper attachment.

Referring to the drawings, FIG. 16 discloses a container assembly 110 according to the present invention. As shown in FIG. 17 the container assembly 110 generally comprises a first container 112 and a second container 114. The container assembly 110 is configured to hold a first flowable substance 116 and a second flowable substance 118. The first container 112 holds the first flowable substance 116, and the second container 114 holds the second flowable substance 118.

As further shown in FIGS. 17 and 18, the container assembly 110 generally comprises a first container 112 with an elongated axis having a peripheral wall 120. In one preferred embodiment, the first container 112 is cylindrical. However, the first container 112 can be molded in numerous shapes, including an elliptical shape. The first container 112 of the container assembly 110 may be an extruded tube 122. The first container 112 generally comprises an interior surface 124, an exterior surface 126, a distal end 128, and a proximate end 130. The distal end 128 of the first container 112 can be closed by a number of sealing methods, including heat or adhesive sealing. Additionally, and as described in greater detail below, it is contemplated that the distal end of the second container 114 can be heat sealed together with the distal end 128 of the first container 112. The proximate end 130 of the first container 112 can be used for dispensing a mixture 132 from the container assembly 110 as will be discussed in further detail below. As such, the proximate end 130 is selectively openable and may have a dispenser 134 with a removable twist off closure 136. In one embodiment, a removable twist off closure is provided and reveals an opening at the proximate end 130 through which the mixture 132 can be dispensed. It is further contemplated that the proximate end 130 may have any of the applications 90 as described herein.

The container assembly 110 is configured with the second container 114 operably associated and positioned within the first container 112. The second container 114 is similar to the first container 12 of container assembly 10 as discussed above. It is understood that the second container 114 of FIG. 17 is formed using the same process as described above. The second container 114 in FIG. 17 has a smaller diameter than shown in FIG. 1. The second container 114 of container assembly 110 may be a plastic ampoule 138. The second container 114 generally comprises a first chamber 140 and a second chamber 142 separated by a membrane or web 144. As mentioned above, a two-chamber dispenser is one preferred embodiment, however more or less chambers are contemplated as being defined within the second container 114. The first chamber 140, which is adapted to contain the material to be dispensed, has an interior surface 146, an exterior surface 148, and a distal end 150. The second chamber 142 has an interior surface 152, an exterior surface 154, and a proximate end 156. An end portion 158 is located on the exterior surface 148 of the first chamber 140 at the distal end 150. As explained above, the distal end 150 of the first chamber 140 can be closed by a number of sealing methods, including heat sealing or adhesive sealing. When the distal end 150 is sealed, and in cooperation with the membrane 144, the first chamber 140 is a closed chamber for holding the first flowable substance 116. Alternatively, the second chamber 142 can be positioned at the proximate end 156.

As further shown in FIG. 17, the second container 114 has a membrane 144 that partitions the second container 114 to separate and, therefore, define the first chamber 140 and the second chamber 142. In a preferred embodiment, the membrane 144 is disposed substantially transverse to the elongated axis L of the second container 114. The structure of membrane 144 of the second container 114 of the container assembly 110 is the same as the membrane 28 of the first container 12 of the container assembly 10 as discussed in great detail above. Thus, the membrane 144 has a plurality of weld seams 166. Additionally, membrane 28 and membrane 144 are structurally the same and function in the same manner. Although FIG. 17 shows the membrane 144 closer to the proximate end 156 than the distal end 150, the placement of the membrane 144 is a function of the desired volume capacity of the first chamber 140 and the second chamber 142. As such, the membrane 144 could be located at numerous locations in the second container 114.

As shown in FIGS. 16-17, the exterior surface 154 of the second container 114 has an exterior extension 160 to indicate the exact location where force should be applied to rupture the membrane 144. Specifically, the extension 160 is located directly adjacent to the membrane 144. Although the extension 160 is shown as a thumb pad with the plurality of ridges 162, any type of raised area or projection including a button, prong or ring will suffice. In addition, a ring of material could be applied around the perimeter of the first container 112 corresponding to the location of the membrane 144 so that a user would know precisely where to apply finger pressure in order to rupture the membrane 144 of the second container 114. An indicia-bearing marking would also be sufficient. As described in greater detail above, a user can apply a certain amount of force to the membrane 144 causing the weld seam 166 to rupture in order to regulate the amount of material that is dispensed from the first chamber 140 of the second container 114 through the membrane 144 and into the second chamber 142 of the second container 114 and the first container 112.

The first container 112 and the second container 114 can be formed from a variety of materials. In one preferred embodiment, the second container 114 is made of a transparent, flexible thermoplastic material. Also, in one preferred embodiment, the first container 112 may also be made of a transparent, flexible thermoplastic material. The preferred plastic material is polyethylene or polypropylene but a number of other plastic materials can be used. For example, low-density polyethylene, polyvinyl chloride or nylon copolymers can be used. In a preferred embodiment, a mixture of polypropylene and polyethylene copolymer or thermoplastic olefin elastomer is used. In another preferred embodiment, a mixture of polypropylene and Flexomer®, available from Union Carbide, is utilized. It is essential that the second container 114 be made of material which is flexible enough to allow sufficient force to rupture or fracture the membrane 144. Additionally, it is possible for the first container 112 or the second container 114 to be a one-piece injection molded container.

The container assembly 110 is assembled or constructed by first providing the second container 114 which can be passed on to a filling apparatus. The second container 114 is filled with a second flowable substance 118, and then sealed by heat sealing dies. The excess end portion can then be cut-off and discarded. It is understood that heat sealing is one preferred seal while other sealing methods could also be utilized. The second container 114 may be suitably cleaned or sterilized before and after the filling process for the particular application of the container assembly 110. The second container 114 is then placed into the first container 114. After placing the second container 114 into the first container 112, the first container 112 is then passed on to another filling apparatus. The first container 112 is filled with a first flowable substance 116. The distal end 128 of the first container 112 is also sealed by heat sealing dies. In one preferred embodiment, the distal end 150 can be heat sealed together with the distal end 128 of the first container 112. In such configuration, the second container 114 is suspended into a first container 112 from the distal end 128. The excess portion can then be cut-off and discarded. Also, as previously discussed and shown in FIG. 18, the respective ends of the first container 112 and the second container 114 can be sealed together. In this configuration, the second container 114 is suspended into the chamber of the first container 112 from an end of the container assembly 110. As mentioned above, it is understood that heat sealing is one preferred seal, while other sealing methods could be utilized.

FIGS. 19-20 disclose the overall operation of the container assembly 10. Compression of the first container 112 with sufficient force by finger pressure, causes the membrane 144 of the second container 114 to shear and rupture along the weld seams 166. The membrane 144 ruptures only along the weld seams 166 to create membrane openings as discussed in detail above. Upon rupture of the membrane 144, the second flowable substance 118 passes from the first chamber 140 through the membrane 144 and into the second chamber 142. The material flow rate through the membrane 144 and into the second chamber 142 is controlled by the degree of membrane opening which is directly related to the amount of force applied to the membrane 144 by the user. Therefore the user can precisely regulate the flow of material after rupture of the membrane 144. In addition, the membrane 144 can preferably have elastic characteristics wherein when force is removed, the membrane 144 returns substantially to its original position. While the weld seams 166 may be ruptured, the segments can form a close enough fit to prevent material from flowing past the membrane 144 without additional pressure on the material. Thus the membrane 144 can act as a check valve to prevent unwanted discharge of the material.

Thus, upon rupturing the membrane 144 of the second container 114, the second flowable substance 118 passes from the first chamber 140, past the membrane 144, and into the second chamber 142. As the second chamber 142 has an open end, the second flowable substance 118 is released into the first container 112. The second flowable substance 118 mixes with the first flowable substance 116 to define a mixture 132 within the first container 112. The mixture 132 can be dispensed from the first container 112. As shown in FIG. 20, the twist off closure 136 is removed to provide the opening in the first container 112. As shown in FIG. 20, the mixture 132 can then be dispensed from the assembly 110.

With the container configuration of FIGS. 16-20, the first container 112 can be an extruded tube of polyethylene or polypropylene. Such material may not be conducive to an injection molding process to form a weld seam as in the second container. However, this material of the first container 112 may be more resistant to degradation by certain types of flowable substances. Thus, this gives increased options with respect to the flowable substances to be used.

Referring to the drawings, FIG. 21-23 discloses a container assembly 210 according to the present invention. The container assembly 210 generally comprises a first container 212 and a second container 214. The first container 212 is configured to hold a first flowable substance 216, and the second container 214 is configured to hold a second flowable substance 218.

The first container 212 has an elongated axis L and has a peripheral wall 220. In one preferred embodiment, the first container 212 is cylindrical. However, the first container 212 can be molded in numerous shapes, including an elliptical shape.

As further shown in FIGS. 21-23, the first container 212 of the container assembly 210 may be a plastic ampoule 222. The first container 212 is configured to hold a first flowable substance 216. The first container 212 is generally the same as the first container 12 in FIG. 1 and similar elements will be referred to with similar reference numerals but in a 200 series. The first container 212 generally comprises a first chamber 224 and a second chamber 226 separated by a membrane or web 228 described in greater detail below. While a two-chamber dispenser is one preferred embodiment, more or less chambers can also be defined within the first container 212. The first chamber 224 has an interior surface 230, an exterior surface 232 and a distal end 234. The second chamber 226 has an interior surface 236, an exterior surface 238, and a proximate end 240. An end portion 242 is located on the exterior surface 232 of the first chamber 224 at the distal end 234. As explained above, in another embodiment, the distal end 234 of the first chamber 224 can be closed by a number of sealing methods, including heat or adhesive sealing. When the distal end 234 is sealed, and in cooperation with the membrane 228, the first chamber 224 is a closed chamber for holding the first flowable substance 216. If desired, the first container 212 can be necked down wherein the second chamber 226 has a smaller diameter than the diameter of the first chamber 224. Alternatively, the second chamber 226 can be positioned at the proximate end 240.

As further shown in FIG. 22, the first container 212 has a membrane 228 that partitions the first container 212 to separate and, therefore, define the first chamber 224 and the second chamber 226. Also in a preferred embodiment, the membrane 228 is disposed substantially transverse to the elongated axis L of the first container 212. The structure of membrane 228 of the first container 214 of the container assembly 210 is the same as the membrane 28 of the first container 12 of the container assembly 10 as discussed in great detail above. Additionally, the membrane 28 of FIG. 2 and the membrane 228 of FIG. 22 are structurally the same and function in the same manner. Although FIGS. 21-23 show the membrane 228 closer to the proximate end 240 than the distal end 234, the placement of the membrane 228 is a function of the desired volume capacity of the first chamber 224 and the second chamber 226. As such, the membrane 228 could be located at numerous locations in the first container 212.

As shown in FIGS. 21-23, the exterior surface 244 of the first container 212 has an exterior extension 246 to indicate the exact location where force should be applied to rupture the membrane 228. Specifically, the extension 246 is located directly adjacent to the membrane 228. Although the extension 246 is shown as a thumb pad with the plurality of ridges 248, any type of raised area or projection including a button, prong or ring will suffice. In addition, a ring of material could be applied around the perimeter of the first container 212 corresponding to the location of the membrane 228 so that a user would know precisely where to apply finger pressure in order to rupture the membrane 228 of the first container 212. An indicia-bearing marking would also be sufficient. As described in greater detail above, a user can apply a certain amount of force to the membrane 228 causing the weld seam 66 to rupture in order to regulate the amount of material that is dispensed from the first chamber 224 of the first container 212 through the membrane 228 and into the second chamber 226 of the first container 212. The interior surface 238 of the second chamber 226 can secure different applicators, such as a swab or dropper, which can be used to apply the dispensed liquid or solid material. The swab or dropper forms an interference fit with the interior surface 238 of the second chamber 226.

As discussed in greater detail above, in a preferred embodiment, the first container 212 is made of a transparent, flexible thermoplastic material. It is essential that the first container 212 be made of material which can be formed using the injection-molded process described above to form a weld seam, and which is flexible enough to allow sufficient force to rupture or fracture the membrane 228. Additionally, it is possible for the first container 212 to be a one-piece injection molded container.

As further shown in FIGS. 21-23, the second container 214 of the container assembly 210 is positioned within the first container 212. In one preferred embodiment, the second container 214 is positioned within the first chamber 224 of the first container 212. The second container 214 is configured to hold the second flowable substance 218. The second container 214 may be a traditional glass ampoule 250 that is known in the art.

As shown in FIGS. 24-27, in one preferred embodiment the glass ampoule 250 has a porous netting 254 that encapsulates the glass ampoule 250 in order to prevent any shards of glass from contaminating the mixture to be formed. The netting 254 may comprise an expandable monofilament sleeve which is produced by a braiding technique whereby PET (Polyethylene Terehthalate) monofilaments are braided into a tubular sleeve 256 as shown in FIG. 25. PET has the physical characteristics of being tough, lightweight, resistant to chemicals and fungus, and is approved for use up to 125° C. Additionally, the netting may have the characteristics of being non-absorbent. In one exemplary embodiment of the invention, the netting 254 is non-absorbent. Non-absorbency in such exemplary embodiment maximizes the amount of second flowable substance passing through the netting 254 and mixing with the first flowable substance. In certain applications, it is undesirable for the netting 254 to be absorbent as too much of the flowable substance will be absorbed by the netting 254 rather than mixing with the first flowable substance. The tubular sleeve 256 may also comprise Nylon, Halar®, Teflon®, Ryton®, Reflex, Mylar, Kevlar, fiberglass or other suitable materials known in the art. As will be described in greater detail below, the netting 254 offers tough durable protection for the glass ampoule until rupture is desired and contains the glass shards within the netting upon rupture while allowing the flowable substance to pass through the mesh openings 258. Generally, the netting 254 sleeve can expand to 1.5 times or more than its original size. The netting 254 has mesh openings 258 as shown in FIGS. 25 and 27. The mesh openings 258 vary as the sleeve is flexed. The mesh openings 258 are determined by several factors, including the closeness of the weave, the number of the filaments used as well as the outer diameter ("OD") of the filaments that are braided to form the netting 254. Typically, the filament OD is generally within the range of 0.018 of an inch to 0.060 of an inch. However, the OD can vary as desired. In one preferred embodiment, the mesh openings 258 are generally within the range of 0.001 of an inch to 0.010 of an inch to prevent any glass shards from contaminating the mixture 252. This range can also vary depending on the application. Although one preferred embodiment has a netting 254 encapsulating the second container 214, it is further contemplated that the netting 254 may be omitted if desired (FIGS. 22 and 23), such as an application where containment of the glass shards is not important. The tubular sleeve 256 is tested to several ASTM tests to assess for proper parameters of the netting 254 for protection from glass shards.

The netting 254 is initially in a roll form. A supply of glass ampoules, prefilled with the desired second flowable substance, is also provided. The netting material 254 is unrolled, and the glass ampoules are sequentially inserted into the an end opening of the netting 254. A pre-determined space is maintained between each glass ampoule. The netting material is then heat-sealed on each end of the glass ampoule. The sealed netting is then cut between each ampoule. An assembly having the glass ampoule surrounded by the sealed netting 254 is thus formed.

As shown in FIG. 25, the container assembly 210 is constructed by first providing the second container, or the glass ampoule 214. The second container 214 is filled with a second flowable substance 218 as is known in the art. The second container 214 is then placed into the netting 254 as described above. The second container 214, surrounded by the sealed netting, is then placed within the first container 212 as shown in FIG. 24. In an application that does not utilize the netting 254, only the glass ampoule is placed within the first container 212 (FIG. 21). It is also understood that the second container 214 may be cleaned or sterilized as is necessary for the particular application. After placing the second container 214 into the first container 212, the first container 212 is then passed on to a filling apparatus. The first container 212 is filled with a first flowable substance 216. The distal end 234 of the first container 212 is then sealed by heat sealing dies. The excess portion can then be cut-off and discarded. As mentioned above, it is understood that heat sealing is one preferred seal, while other sealing methods could be utilized.

FIGS. 21-23 and 28-30 disclose the operation of the container assembly 210. Compression of the first container 212 with sufficient force by finger pressure, causes the second container or glass ampoule 214 to fractionate. Upon fractionating the second container 214, the glass shards are trapped by the netting 254. Although the mesh openings 258 are of a size small enough to prevent glass shards from passing through, the mesh openings 258 are big enough to allow the second flowable substance 218 to pass through and mix with the first flowable substance 216 of the first container 212 to form a mixture 252. The mixture 252 is then dispensed from the first container 212 by rupturing the membrane 228 along the weld seams 266 to create membrane openings as discussed in detail above. Upon rupture of the membrane 228, the mixture 252 passes from the first chamber 224 of the first container 212 through the membrane 228 and into the second chamber 226. As discussed above, the material flow rate through the membrane 228 and into the second chamber 226 is controlled by the degree of membrane opening which is directly related to the amount of force applied to the membrane 228 by the user. Therefore the user can precisely regulate the flow of material after rupture of the membrane 228. In addition, the membrane 228 can preferably have elastic characteristics wherein when force is removed, the membrane 228 returns substantially to its original position. While the weld seams may be ruptured, the segments can form a close enough fit to prevent material from flowing past the membrane 144 without additional pressure on the material. Thus the membrane 228 can act as a check valve to prevent unwanted discharge of the material. The mixture 252 can be dispensed from the first container 212 as discussed above. A variety of the applications can be used with the container assembly 200. As shown in FIGS. 21-23, in applications where it is not important to contain the glass shards from the second container 214, the netting 254 is omitted.

Referring to the drawings, FIG. 31 discloses a container assembly 310 according to the present invention. As shown in FIGS. 31-32 the container assembly 310 generally comprises a first container 312 and a second container 314. The first container 312 is configured to hold a first flowable substance 316, and the second container 314 is configured to hold a second flowable substance 318.

The first container 312 has an elongated axis L and has a peripheral wall 320. In one preferred embodiment, the first container 312 is cylindrical. However, the first container 312 can be molded in numerous shapes, including an elliptical shape.

As further shown in FIGS. 31-32, the first container 312 of the container assembly 310 may be a plastic ampoule 322 as described in great detail above. The first container 312 is configured to hold the first flowable substance 316. The first container 312 is generally the same as the first container 12 in FIG. 1 and similar elements will be referred to with similar reference numerals but in a 300 series. The first container 312 generally comprises a first chamber 324 and a second chamber 326 separated by a membrane or web 328 as described above. While a two-chamber dispenser is one preferred embodiment, more or less chambers can also be defined within the first container 312. The first chamber 324 has an interior surface 330, an exterior surface 332 and a distal end 334. The second chamber 326 has an interior surface 336, an exterior surface 338, and a proximate end 340. An end portion 342 is located on the exterior surface 332 of the first chamber 324 at the distal end 334. As explained above in another embodiment, the distal end 334 of the first chamber 324 can be closed by a number of sealing methods, including heat or adhesive sealing. When the distal end 334 is sealed, and in cooperation with the membrane 328, the first chamber 324 is a closed chamber for holding the first flowable substance 316. If desired, the first container 312 can be necked down wherein the second chamber 326 has a smaller diameter than the diameter of the first chamber 324. Alternatively, the second chamber 326 can be positioned at the proximate end 340.

As further shown in FIG. 34, the first container 312 has a membrane 328 that partitions the first container 312 to separate and, therefore, define the first chamber 324 and the second chamber 326. Also in a preferred embodiment, the membrane 328 is disposed substantially transverse to the elongated axis L of the first container 312. The structure of membrane 328 of the first container 314 of the container assembly 310 is the same as the membrane 28 of the first container 12 of the container assembly 10 as discussed in great detail above. Additionally, the membrane 28 of FIG. 1 and the membrane 328 of FIGS. 31-37 are structurally the same and function in the same manner. Thus, the membrane 328 has a plurality of weld seams 366 formed as described above. Although FIG. 34 shows the membrane 328 closer to the proximate end 340 than the distal end 334, the placement of the membrane 328 is a function of the desired volume capacity of the first chamber 324 and the second chamber 326. As such, the membrane 328 could be located at numerous locations in the first container 312.

As shown in FIGS. 31 and 32, the exterior surface 344 of the first container 312 has an exterior extension 346 to indicate the exact location where force should be applied to rupture the membrane 328. Specifically, the extension 346 is located directly adjacent to the membrane 328. Although the extension 346 is shown as a thumb pad with the plurality of ridges 348, any type of raised area or projection including a button, prong or ring will suffice. In addition, a ring of material could be applied around the perimeter of the first container 312 corresponding to the location of the membrane 328 so that a user would know precisely where to apply finger pressure in order to rupture the membrane 328 of the first container 312. An indicia-bearing marking would also be sufficient. As described in greater detail above, a user can apply a certain amount of force to the membrane 328 causing the weld seam 366 to rupture in order to regulate the amount of material that is dispensed from the first chamber 324 of the first container 312 through the membrane 328 and into the second chamber 326 of the first container 312.

As shown in FIG. 32, the interior surface 336 of the second chamber 326 can secure different applicators 354, such as a swab or dropper (FIG. 32), which can be used to apply the dispensed liquid or solid material. The swab or dropper forms an interference fit with the interior surface 336 of the second chamber 326.

It is understood that the first container 312 can be made using the same injection-molded process described above and using similar materials.

As further shown in FIGS. 31 and 34, the second container 314 of the container assembly 310 is positioned within the first container 312. In one preferred embodiment, the second container 314 is positioned within the first chamber 324 of the first container 312. The second container 314 is configured to hold the second flowable substance 318. The second container 314 generally has a body 370 that has a rupturable or fractionable weld seam 372. In one preferred embodiment, the weld seam 372 is a circumferential weld seam 372.

As further shown in FIG. 33, the body 370 has a wall 374 and is generally cylindrical although other shapes are possible. The body 370 is preferably sized similar to the glass ampoule previously described in earlier embodiments. The body 370 has a proximal end 376 that is closed and is generally dome-shaped. The body 370 also has a distal end 378 that is initially opened but sealed after being filled. The wall 374 of the body 370 defines an inner chamber to hold the second flowable substance 318.

As shown in FIGS. 33 and 34, the circumferential weld seam 372 is formed around a periphery of the container 314. In one exemplary embodiment, the circumferential weld seam 372 extends around a full periphery of the container 314. The circumferential weld seam further extends around the periphery generally along a linear path. The circumferential weld seam 372 is positioned in the wall 374 generally adjacent the dome-shaped proximal end 376. The circumferential weld seam may be considered circumjacent the dome-shaped proximal end 376. It is understood that the circumferential weld seam 372 could be positioned at various locations as desired for a particular application. As can be understood from FIGS. 34 and 38A, the wall 374 has a general thickness t3. The circumferential weld seam 372 has a thickness t4 that is less than the wall thickness t3. Thus, the outer surface of the wall 374 may be considered to have an indentation 380 (FIG. 33) therein at the weld seam 350. This facilitates rupture of the weld seam 372 as described below.

Figure 38:
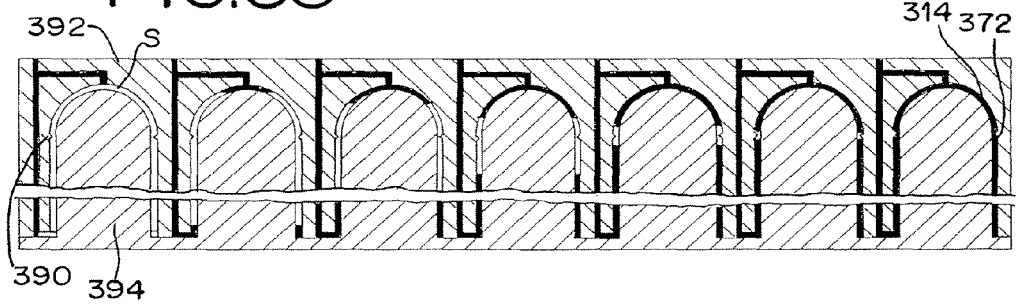
FIG. 38 is a schematic cross-sectional view showing the formation of the inner container shown in FIG. 32.
Figure 38A:
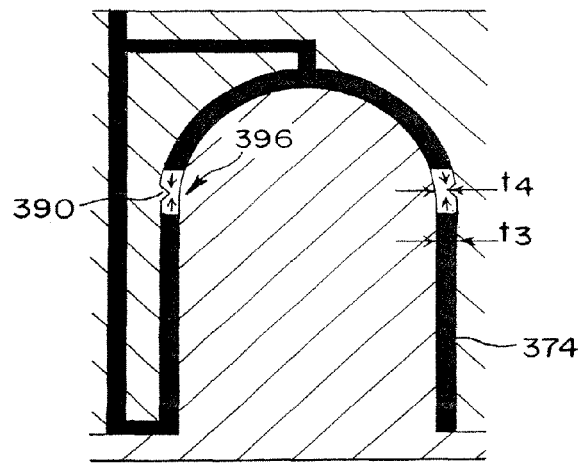
FIG. 38A is a partial enlarged schematic cross-sectional view from FIG. 38 showing segments moving to abut to form a circumferential weld line or circumferential weld seam.

FIGS. 38 and 38A disclose the process utilized for forming the second container 314. The second container 314 of FIGS. 31 and 32 is formed in a single molding operation to provide a one-piece injected-molded part. A mold is provided having an outer mold part 392 and an inner mold part 394. The inner mold part 394 may be shaped like a rod or mandrel. The mold parts 392, 394 confront each other and define a mold space S between the mold parts 392, 394 that generally defines the overall shape of the second container 314. The outer mold part 392 has a circumferential rib 390 thereon. The rib 390 confronts in closer relation the inner mold part 392. The mold is provided with suitable injection points. As shown in FIG. 38 and FIG. 38A, upon commencement of the injection molded process, a first mold segment moves in the mold toward the rib 390 in one direction and a second mold segment moves in the mold toward the rib 390 in an opposite direction. As further shown in FIG. 38A, the mold segments continue to flow and abut at an interface area 396 generally at the circumferential rib 390 confronting the inner mold part 394. The mold segments meet and abut at the interface area 396 to form the circumferential weld seam 372. The circumferential weld seam 372 has a lesser thickness t4 than the overall wall thickness t3 of the wall 374. The mold is suitably cooled and vented as discussed above. Upon completion, the container 314 is removed from the mold.

The container assembly 310 is constructed by first providing the second container 314 which can be passed on to a filling apparatus. The second container 314 is filled with a second flowable substance 318, and then sealed by heat sealing dies. The excess end portion can then be cut-off and discarded. It is understood that heat sealing is one preferred seal while other sealing methods could also be utilized. A cap could also be provided for the distal end 378 of the container 314 if desired. The second container 314 is then placed into the first container 314 as shown in FIGS. 32 and 34. The second container 314 may be suitable cleaned or sterilized as discussed above. After placing the second container 314 into the first container 312, the first container 312 is then passed on to another filling apparatus. The first container 312 is filled with a first flowable substance 316. As shown in FIG. 34, the distal end 334 of the first container 312 is also sealed by heat sealing dies. The excess portion can then be cut-off and discarded. As mentioned above, it is understood that heat sealing is one preferred seal, while other sealing methods could be utilized.

Figure 35:
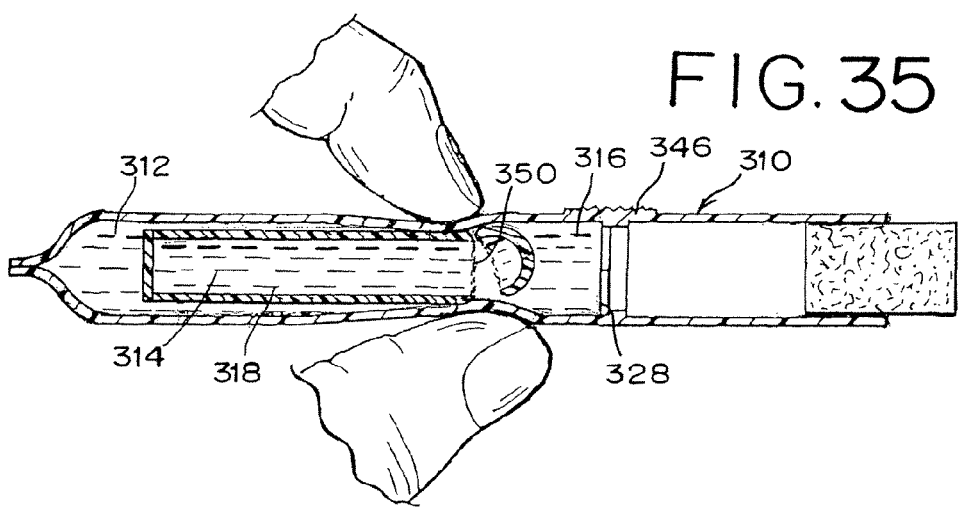
FIG. 35 is a cross-sectional view as in FIG. 34 depicting a user rupturing the inner container.
Figure 36:
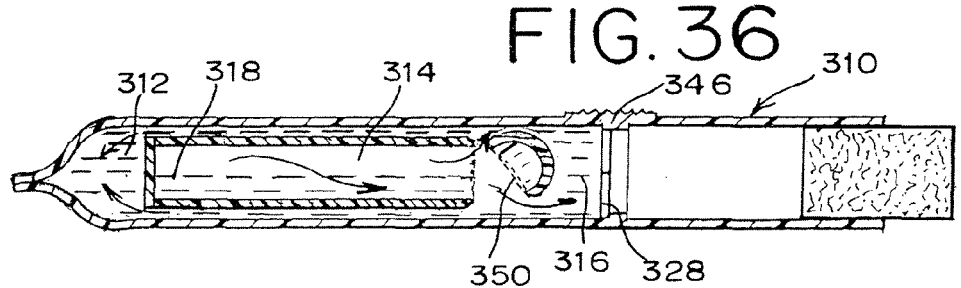
FIG. 36 is a cross-sectional view as in FIG. 34 of the inner container, showing the inner container in an open position.
Figure 37:
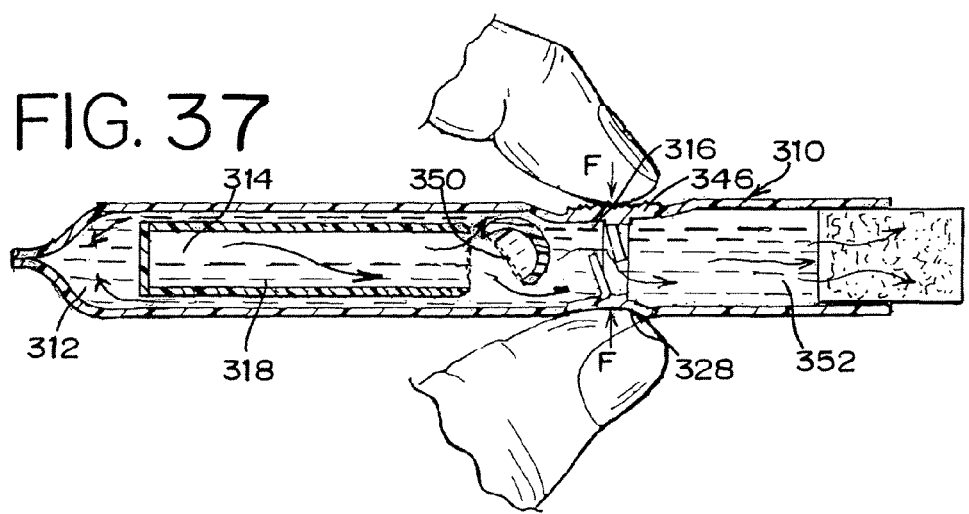
FIG. 37 is a cross-sectional view as in FIG. 34 depicting a user rupturing the outer container.
Figure 39:
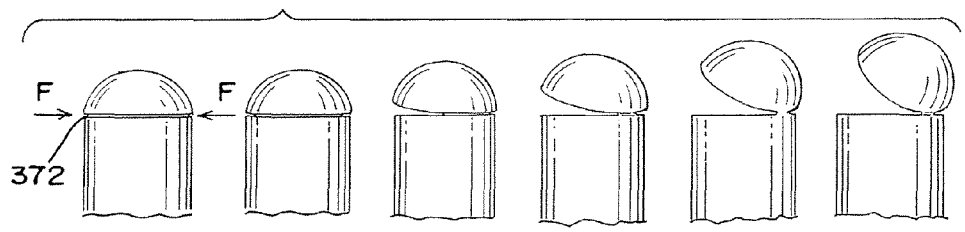
FIG. 39 is series of partial perspective views of the inner container of the container assembly of FIG. 31 showing rupture of the circumferential weld seam.

FIGS. 35-37 disclose the overall operation of the container assembly 310. Compression of the first container 312, such as by finger pressure, causes the circumferential weld seam 372 of the second container 314 to break, rupture, or fractionate only along the circumferential weld seam 372 to create an opening for release of the second flowable substance 318 from the second container 314 to mix with the first flowable substance 316 in the first chamber 324 of the first container 312 to define a mixture 352. FIG. 39 shows a series of views that show the rupture of the circumferential weld seam 372 upon application of a generally transverse force F proximate the weld seam 372. The weld seam 72 fractures along a circumferential path around the container 314 thereby opening the container 314.

As further shown in FIG. 37, the user applies a selective force F on the container assembly 310 at the exterior extension 346 adjacent to the membrane 328. When sufficient force is applied, lateral pressure is applied to the membrane 328 causing the membrane 328 to shear and rupture along the weld seams 366. The membrane 328 ruptures only along the weld seams 366 to create membrane openings 356. Upon rupture of the membrane 328, the mixture 352 passes from the first chamber 324 through the membrane 328 and into the second chamber 326. The material flow rate through the membrane 328 and into the second chamber 326 is controlled by the degree of membrane opening 356 which is directly related to the amount of force applied to the membrane 328 by the user. Therefore the user can precisely regulate the flow of material after rupture of the membrane 328. In addition, the membrane 328 can preferably have elastic characteristics wherein when force is removed, the membrane 328 returns substantially to its original position. While the weld seams 366 may be ruptured, the membrane segments can form a close enough fit to prevent material from flowing past the membrane 328 without additional pressure on the material. Thus the membrane 328 can act as a check valve to prevent unwanted discharge of the material. In one preferred embodiment, the mixture 352 is then dispensed from the first container 312 as discussed above. The applicator 354 shown in FIGS. 35-37 is in the form of a swab. Other applicators can be used to dispense the mixture 352.

It is also understood that a user could use the second container 314 as a separate container for storing and dispensing a flowable substance. Such container 314 is easily filled and sealed and selectively opened when desired. The container 314 resists opening if subjected to compression of the flowable substance such as by squeezing a distal end of the container 314. The container 314 can generally only be opened by applying the force F proximate the circumferential weld seam 372. The container 314 can be formed more efficiently as the weld seam 372 is formed during the injection molded process and controlled during the process. An extra processing step to form a weakened area around the container 314 is unnecessary.

The dispensers or container assemblies described above are designed to primarily contain and dispense flowable substances or flowable materials that are fluids. Other flowable materials can also be used. For example, in one embodiment the flowable materials could both be fluids. In another embodiment, the first flowable material could be a liquid, and the second flowable material could be a powder to be mixed with the fluid. Other combinations depending on the use are also permissible. This permits the dispenser to be used in a wide variety of uses, and contain and dispense a large variety of fluids and other flowable substances. The following is a non-exhaustive discussion regarding the many possible uses for the dispensers or container assemblies of the present invention. It is understood that related uses to those described below are also possible with the embodiments of the present invention.

In one example, the dispenser can be used in a two-part hair care product such as a hair dye kit. A first flowable substance of the hair dye kit can be carried in the first chamber, and a second flowable substance of the hair dye kit can be carried in the second chamber. The membrane is ruptured wherein the two flowable substances can be mixed together to form a mixture or solution. The mixture or solution can then be dispensed from the dispenser onto the hair of a user. In a multitude of other examples, the dispenser can dispense a flowable material or mixture that is an adhesive, epoxy, or sealant, such as an epoxy adhesive, craft glue, non-medical super glue and medical super glue, leak sealant, shoe glue, ceramic epoxy, fish tank sealant, formica repair glue, tire repair patch adhesive, nut/bolt locker, screw tightener/gap filler, super glue remover or goo-b-gone. Also, the dispenser can dispense a flowable material or mixture that is an automotive product, such as a rear view mirror repair kit, a vinyl repair kit, an auto paint touch up kit, a window replacement kit, a scent or air freshener, a windshield wiper blade cleaner, a lock de-icer, a lock lubricant, a liquid car wax, a rubbing compound, a paint scratch remover, a glass/mirror scratch remover, radiator stop-leak, or a penetrating oil. The dispenser 10 can also dispense a flowable material or mixture that is a chemistry material, such as a laboratory chemical, a fish tank treatment, a plant food, a cat litter deodorant, a buffer solution, a rehydration solution of bacteria, a biological stain, a rooting hormone, a colorant dispenser, or disinfectants.

Moreover, the dispenser can dispense a flowable material or mixture that is a cosmetic, fragrance or toiletry, such as nail polish, lip gloss, body cream, body gel, hand sanitizer, cologne, perfume, nail polish remover, liquid soaps, skin moisturizers, tooth whiteners, hotel samples, mineral oils, toothpastes, or mouthwash. The dispenser can also dispense a flowable material or mixture that is an electronics product, such as a cleaning compound, a telephone receiver sanitizer, a keyboard cleaner, a cassette recorder cleaner, audio/video disc cleaner, a mouse cleaner, or a liquid electrical tape. In addition, the dispenser can dispense a flowable material or mixture that is a food product, such as food colorings, coffee flavorings, spices, food additives, drink additives, confections, cake gel, sprinkles, breath drops, condiments, sauces, liquors, alcohol mixes, energy drinks, or herbal teas and drinks. The dispenser can also dispense a flowable material or mixture that is a hair care product, such as hair bleaches, hair streaking agent, hair highlighter, shampoos, hair colorants, conditioners, hair gels, mousse, hair removers, or eyebrow dye. The dispenser can also dispense a flowable material that is a home repair product, such as a caulking compounds or materials, a scratch touch up kit, a stain remover, a furniture repair product, a wood glue, a patch lock, screw anchor, wood tone putty or porcelain touch-up.

In addition, the dispenser can dispense a flowable material or mixture that is a test kit, such as a lead test kit, a drug kit, a radon test kit, a narcotic test kit, a swimming pool test kit (e.g., chlorine, pH, alkalinity etc.), a home water quality tester, a soil test kit, a gas leak detection fluid, or a pregnancy tester. The dispenser can dispense a large variety of lubricants including industrial lubricants, oils, greases, graphite lubricants or a dielectric grease. The dispenser can also dispense a flowable material or mixture that as part of a medical device test kit, such as a culture media, a drug monitoring system, a microbiological reagent, a streptococcus test kit, or a residual disinfectant tester. In addition, the dispenser can dispense a large variety of medicinal products, such as blister medicines, cold sore treatments, insect sting and bit relief products, skin cleaning compounds, tissue markers, topical antimicrobials, topical demulcent, treatments for acne such as acne medications, umbilical area antiseptics, cough medicines, waterless hand sanitizers, toothache remedies, cold medicines and sublingual dosages. Furthermore, the dispenser can dispense a flowable material or mixture that is a novelty product, such as a chemiluminescent light, a Christmas tree scent, a glitter gel, and a face paint. The dispenser can also dispense a variety of paint products such as novelty paints, general paints, paint additives, wood stain samples, caulk, paint mask fluid or paint remover. The dispenser can also dispense a flowable material or mixture that is a personal care product, such as shaving cream or gel, aftershave lotion, skin conditioner, skin cream, skin moisturizer, petroleum jelly, insect repellant, personal lubricant, ear drops, eye drops, nose drops, corn medications, nail fungal medication, aging liquids, acne cream, contact lens cleaner, denture repair kit, finger nail repair kit, liquid soaps, sun screen, lip balm, tanning cream, self-tanning solutions or homeopathic preparations. A large variety of pest control products can be dispensed by the dispenser, including insect attractants, pesticides, pet medications, pet insect repellants, pet shampoos, pest sterilizers, insect repellants, lady bug attractant and fly trap attractant. Various safety products can be dispensed through the dispenser including respirator tests and eye wash solution.

The dispenser can also dispense a large variety of stationery or craft products, such as magic markers, glitter gels, glitter markers, glitter glues, gel markers, craft clues, fabric dyes, fabric paints, permanent markers, dry erase markers, dry eraser cleaner, glue sticks, rubber cement, typographic correction fluids, ink dispensers and refills, paint pens, counterfeit bill detection pen, envelope squeeze moisturizers, adhesive label removers, highlighters, and ink jet printer refills. The dispenser can also dispense various vitamins, minerals, supplements and pet vitamins. The dispenser can also dispense a flowable material or mixture in a variety of other applications such as for aroma therapy products, breathalyzer tests, wildlife lures, eyeglass cleaners, portable lighting fuels, bingo and other game markers, float and sinker devices, toilet dyes and treatments, dye markers, microbiological reagents, shoe polishes, clothing stain removers, carpet cleaners and spot removers, tent repair kits, plumbing flux applicator, rust remover, tree wound treatment, animal medicine dispenser, animal measured food dispenser, odor eliminator liquids, multi-purpose oils, ultrasonic cleaner concentrate, manufacturing parts assembly liquids and irrigation solutions. In addition, the dispenser can be used as, or in connection with a suction device for culture sampling, taking various liquid samples, taking various swabbing samples and for acting as a chemical tester, such as may be used for testing drinks for various "date rape" drugs. In addition, the dispenser can dispense a variety of sports products including sports eye black, football hand glue, and baseball glove conditioner and pine tar. The dispenser can dispense any variety of flowable materials including liquids and powders, and further including a liquid and a powder, two or more powders, or two or more liquids. The dispenser may be used as part of 2-part system (mix before use) including a liquid with a powder, a liquid with a liquid, a powder with a powder, or sealed inside another tube or product container or partially sealed, connected or attached to another container. The dispenser may also be used as part of a plunger dispensing system and diagnostic testing. In addition, the dispensers and container assemblies may also be used in other types of test kits such as testing for gun powder or explosives such as in a bomb detection kit. The dispensers can further be used in radiation testing. The dispensers can also be used in DNA sampling applications.

The dispenser of the present invention may also be used for windshield wiper blade cleaner and other automotive applications, fragrances, pastry gels, eyebrow dye, paints, hair paints, finger nail repair kit, animal medicine dispenser, animal food dispenser, culture media samples, drug test kits, and chemical testers (e.g. date rape etc.). As an illustration, although the applicator has been described as being utilized for mechanical uses, it can similarly be used for applying adhesives, mastic or the like.

While the specific embodiments have been illustrated and described, numerous modifications come to mind without significantly departing from the spirit of the invention, and the scope of protection is only limited by the scope of the accompanying Claims.

What is claimed is:

1. A container assembly comprising: a first container configured to hold a first flowable substance, the first container having a weld seam; a second container configured to hold a second flowable substance, the second container positioned in the first container, the second container being selectively openable, wherein the second container is a glass ampoule; wherein upon opening of the second container, the second flowable substance mixes with the first flowable substance to define a mixture, where upon rupturing of the weld seam, the mixture is dispensable from the first container.

2. The container assembly of claim 1 wherein the first container is a one-piece injection molded container.

3. The container assembly of claim 1 wherein the first container has a membrane wherein the weld seam is positioned in the membrane.

4. The container assembly of claim 3 wherein the first container has an elongated axis, and the membrane is disposed substantially transverse to the elongated axis.

5. The container assembly of claim 3 wherein the first container has a first chamber and a second chamber defined by the position of the membrane.

6. The container assembly of claim 3 wherein the membrane has a plurality of weld seams.

7. The container assembly of claim 3 wherein the membrane has a thickness and the weld seam has a thickness less than the thickness of the membrane.

8. The container assembly of claim 6 wherein the plurality of weld seams extend radially from substantially a center point of the membrane.

9. The container assembly of claim 1 wherein the glass ampoule is surrounded by a non-absorbent netting.

10. The container assembly of claim 5 wherein pressure applied to the second container causes fractionation, wherein the second flowable substance is dispensed from the second container into the first chamber of the first container to define a mixture.

11. The container assembly of claim 10 wherein pressure applied to the membrane causes the weld seam to rupture, wherein the mixture is dispensed from the first chamber of the first container into the second chamber of the first container.

12. A container assembly comprising:
a first container configured to hold a first flowable substance, wherein the first container has a rupturable membrane; and
a second container configured to hold a second flowable substance, the second container in the form of glass ampoule operably associated with the first container, the second container surrounded by a netting.

13. The container assembly of claim 12 wherein the first container is a one-piece injection molded container.

14. The container assembly of claim 12 wherein the first container has an elongated axis, and the membrane is disposed substantially transverse to the elongated axis.

15. The container assembly of claim 12 wherein the first container has a first chamber and a second chamber defined by the position of the membrane.

16. The container assembly of claim 12 wherein the membrane has a plurality of weld seams.

17. The container assembly of claim 12 wherein the membrane has a thickness and a weld seam, the weld seam having a thickness less than the thickness of the membrane.

18. The container assembly of claim 16 wherein the plurality of weld seams extend radially from substantially a center point of the membrane.

19. The container assembly of claim 12 wherein the second container is positioned within the first container.

20. The container assembly of claim 15 wherein pressure applied to the glass ampoule of the second container causes fractionation, wherein the second flowable substance is dispensed from the second container into the first chamber of the first container to define a mixture.

21. The container assembly of claim 20 wherein the netting is porous to allow the second flowable substance to flow through but trap the fractionated glass.

22. The container assembly of claim 21 wherein pressure applied to the membrane causes the rupturable membrane to rupture, wherein the mixture of the first flowable substance and the second flowable substance is dispensed from the first chamber of the first container into the second chamber of the first container.

23. The container assembly of claim 12 wherein the netting is non-absorbent.

24. The container assembly of claim 23 is formed of a plurality of woven fibers.

25. The container assembly of claim 24 wherein the woven fibers define a plurality of openings wherein the openings are sized to trap fractionated glass from rupture of the glass ampoule but allow passage of the second flowable substance through the openings.

26. A container assembly comprising:
a plastic ampoule defining a first chamber and having a membrane having a weld seam, the ampoule holding a first flowable substance;
a glass ampoule holding a second flowable substance, the glass ampoule contained within a non-absorbent netting having a plurality of openings, the glass ampoule positioned within the first chamber,
wherein upon rupturing the glass ampoule into glass shards, the glass shards are contained within the netting while the second flowable substance passes through the openings and mixes with the first flowable substance to define a mixture, where upon fracturing the weld seam, the mixture is dispensable from the first container.

27. A container assembly comprising: a first container configured to hold a first flowable substance, the first container having a weld seam, wherein the first container has a membrane wherein the weld seam is positioned in the membrane, wherein the membrane has a plurality of weld seams, wherein the plurality of weld seams extend radially from substantially a center point of the membrane; a second container configured to hold a second flowable substance, the second container positioned in the first container, the second container being selectively openable; wherein upon opening of the second container, the second flowable substance mixes with the first flowable substance to define a mixture, where upon rupturing of the weld seams, the mixture is dispensable from the first container.

28. A container assembly comprising: a first container configured to hold a first flowable substance, the first container having a weld seam; a glass ampoule configured to hold a second flowable substance, wherein the glass ampoule is surrounded by a non-absorbent netting, the glass ampoule positioned in the first container, the glass ampoule being selectively openable; wherein upon opening of the glass ampoule, the second flowable substance mixes with the first flowable substance to define a mixture, where upon rupturing of the weld seam, the mixture is dispensable from the first container.

* * * * *